United States Patent
Gambino

(10) Patent No.: US 9,930,731 B2
(45) Date of Patent: Mar. 27, 2018

(54) INDUCTION COOKING STRUCTURE AND SYSTEM AND METHOD OF USING THE SAME

(71) Applicant: Kellogg Company, Battle Creek, MI (US)

(72) Inventor: Charles Gambino, Little Rock, AR (US)

(73) Assignee: Kellogg Company, Battle Creek, MI (US)

( * ) Notice: Subject to any disclaimer, the term of this patent is extended or adjusted under 35 U.S.C. 154(b) by 511 days.

(21) Appl. No.: 14/552,858

(22) Filed: Nov. 25, 2014

(65) Prior Publication Data

US 2015/0076138 A1    Mar. 19, 2015

Related U.S. Application Data

(62) Division of application No. 13/162,641, filed on Jun. 17, 2011, now Pat. No. 8,919,245, which is a division
(Continued)

(51) Int. Cl.
*H05B 6/12* (2006.01)
*A21D 13/00* (2017.01)
(Continued)

(52) U.S. Cl.
CPC ............ *H05B 6/1209* (2013.01); *A47J 36/02* (2013.01); *A47J 37/045* (2013.01);
(Continued)

(58) Field of Classification Search
CPC ...... A47J 36/02; A47J 37/045; A47J 37/0611; A47J 37/0676; H05B 6/1209; Y10S 99/14

USPC ........ 219/621, 162, 640; 426/275, 496, 502, 426/503, 505, 523, 128, 138, 249, 94, 426/552; 249/DIG. 1, 117; 99/426, 430, 99/439, 422, 451, DIG. 14, 427, 423, 99/372–384, 512; 148/567, 572, 573; 266/118, 125, 128; 198/402, 408, 690.2, 198/850; 425/182, 439, 453

See application file for complete search history.

(56) References Cited

U.S. PATENT DOCUMENTS 1,540,041 A * 6/1925 Tatosian ................. A21B 5/023
                                                                425/233
1,759,411 A * 5/1930 Morrison ............. A23G 3/0289
                                                                425/182

(Continued)

*Primary Examiner* — Dana Ross
*Assistant Examiner* — Ket D Dang
(74) *Attorney, Agent, or Firm* — Honigman Miller Schwartz and Cohn LLP; Kathryn D. Doyle, Esq.; Jonathan P. O'Brien

(57) ABSTRACT

A method of producing an edible food product includes the step of forming a vessel core with a first material having a first level of susceptibility to heating by induction. The method also includes the step of casting an apron of a second material with a second level of susceptibility to heating by induction lower than said first level around at least a first portion the vessel core in an in situ casting process to form a clad cooking vessel having a cooking surface. An uncooked food product is then disposed on the cooking surface of the clad cooking vessel and heated to produce the edible food product by subjecting the vessel core to a magnetic field.

8 Claims, 19 Drawing Sheets

Related U.S. Application Data of application No. 12/172,683, filed on Jul. 14, 2008, now Pat. No. 7,989,012.

(60) Provisional application No. 60/975,338, filed on Sep. 26, 2007.

(51) Int. Cl.
*A21B 5/02* (2006.01)
*A47J 36/02* (2006.01)
*A47J 37/04* (2006.01)
*A47J 37/06* (2006.01)

(52) U.S. Cl.
CPC ....... *A47J 37/0611* (2013.01); *A47J 37/0676* (2013.01); *Y10S 99/14* (2013.01)

(56) References Cited

U.S. PATENT DOCUMENTS

| | | | | |
|---|---|---|---|---|
| 2,365,769 A * | 12/1944 | Marshall | ............. | A21B 5/02 318/102 |
| 2,575,426 A * | 11/1951 | Parnell | ............. | A23B 7/0053 131/299 |
| 2,859,713 A * | 11/1958 | Noel | ............. | A21B 3/07 198/404 |
| 3,048,129 A * | 8/1962 | Noel | ............. | A21C 13/02 198/793 |
| 3,780,193 A * | 12/1973 | Jersey | ............. | A21B 5/02 426/505 |
| 4,208,441 A * | 6/1980 | Westover | ............. | A21B 5/02 426/293 |
| 4,442,761 A * | 4/1984 | Van Achterberg | ....... | A21B 5/08 426/438 |
| 4,790,292 A * | 12/1988 | Kuhn | ............. | A47J 27/002 126/390.1 |
| 4,987,828 A * | 1/1991 | Nuns | ............. | A21B 1/48 198/711 |
| 7,015,436 B2 * | 3/2006 | Fila | ............. | A21B 1/48 219/388 |
| 2004/0081934 A1 * | 4/2004 | Haas | ............. | A21B 5/02 126/19 R |
| 2009/0320694 A1 * | 12/2009 | Parsons | ............. | A21B 5/02 99/373 |
| 2012/0132638 A1 * | 5/2012 | Rey Garcia | ............. | B65G 17/12 219/385 |
| 2014/0196611 A1 * | 7/2014 | Reinhart | ............. | A21B 5/02 99/374 |

* cited by examiner

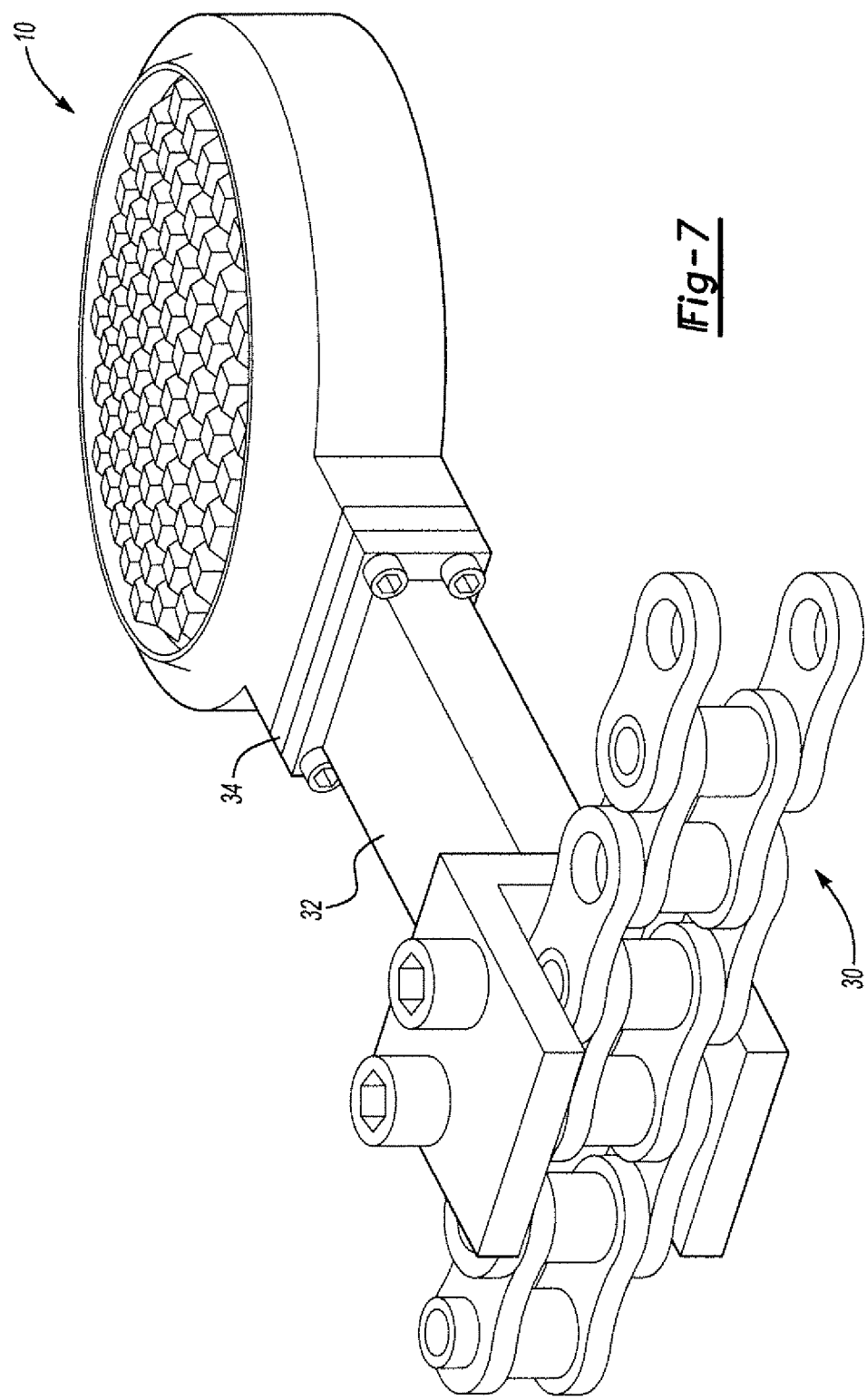

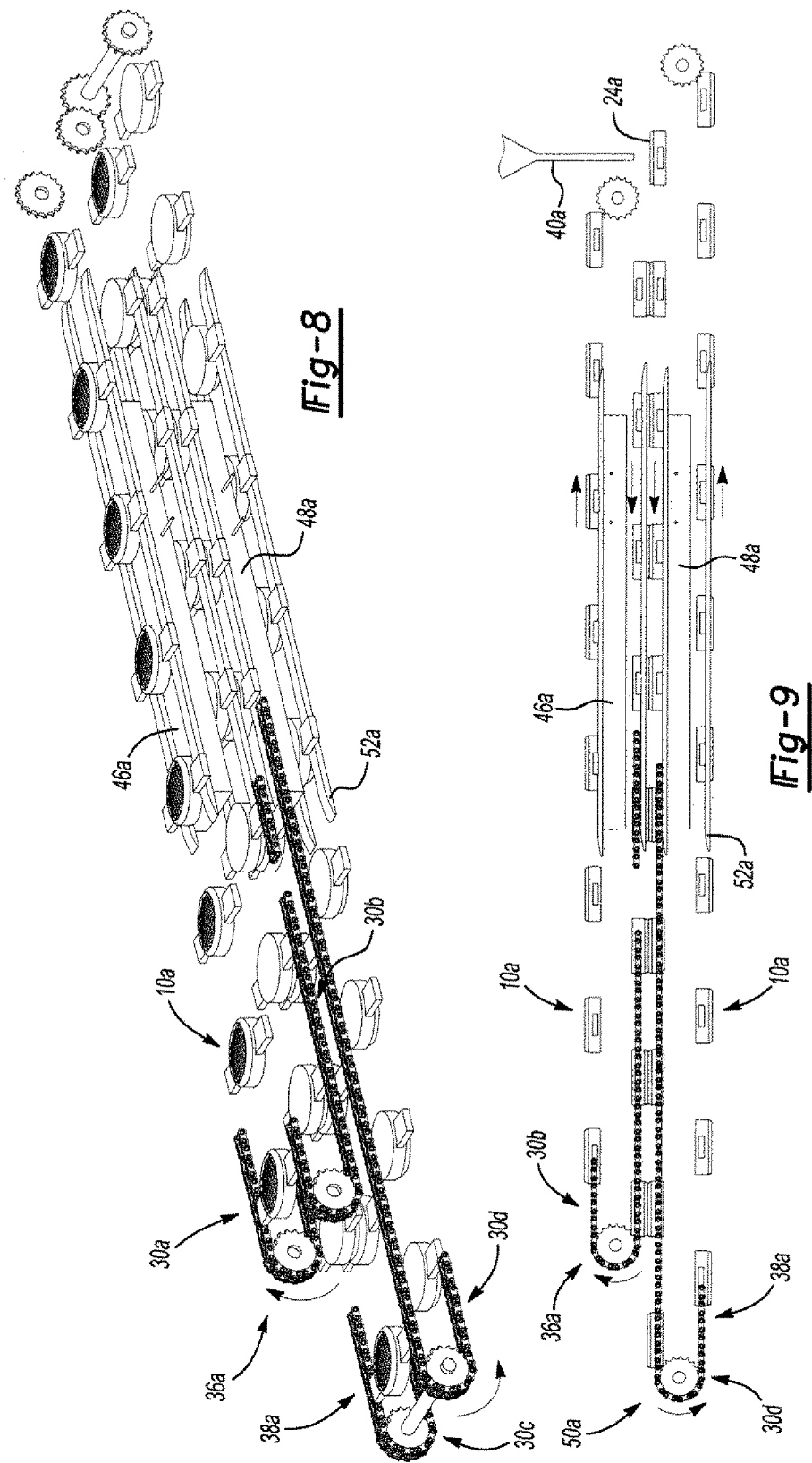

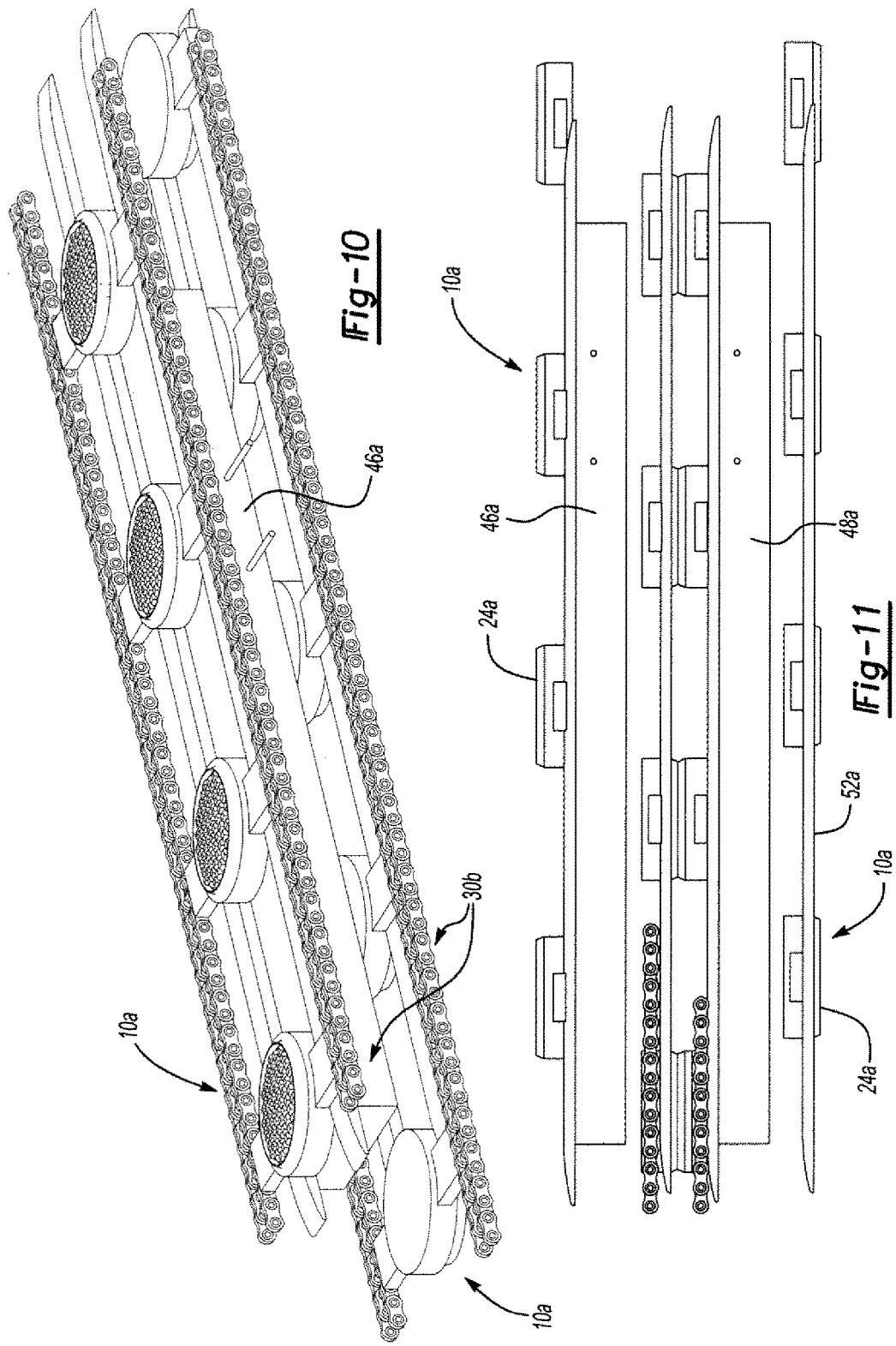

INDUCTION COOKING STRUCTURE AND SYSTEM AND METHOD OF USING THE SAME

CROSS-REFERENCE TO RELATED APPLICATIONS

This application is a divisional of U.S. application Ser. No. 13/162,641 for INDUCTION COOKING STRUCTURE AND SYSTEM AND METHOD OF USING THE SAME, filed Jun. 17, 2011, which is a divisional of U.S. application Ser. No. 12/172,683 for INDUCTION COOKING STRUCTURE AND SYSTEM AND METHOD OF USING THE SAME, filed Jul. 14, 2008, which claims the benefit of U.S. Provisional Patent Application Ser. No. 60/975,338 for an INDUCTION COOKING STRUCTURE AND SYSTEM, filed on Sep. 26, 2007, which is hereby incorporated by reference in its entirety.

BACKGROUND OF THE INVENTION

1. Field of the Invention

The invention relates generally to a clad cooking vessel for cooking food products by induction, and a method utilizing the clad cooking vessel.

2. Description of Related Prior Art

Cooking is the application of heat to food. Since food is usually contained in a vessel, such as a pot or a pan, heat is directed to the vessel and is then conducted to the food. Heat can be generated by fire or electricity. Electrical heating can be accomplished by coil elements, halogen heaters, and induction.

An induction cooking system includes an electromagnet operable to generate an electromagnet field. When a cooking vessel made of magnetic material, such as a cast-iron skillet, is placed in the magnetic field, the field induces a loop current within the magnetic material. Resistance to the flow of current results in the generation of heat. The strength of the electromagnetic field can be controlled to control the amount of heat generated in the cooking vessel.

SUMMARY OF THE INVENTION

In summary, the invention is a method of producing an edible food product. The method includes the step of forming a vessel core with a first material having a first level of susceptibility to heating by induction. The method also includes the step of casting an apron of a second material with a second level of susceptibility to heating by induction lower than said first level around at least a first portion the vessel core in an in situ casting process to form a clad cooking vessel having a cooking surface. An uncooked food product is then disposed on the cooking surface of the clad cooking vessel and heated to produce the edible food product by subjecting the vessel core to a magnetic field.

BRIEF DESCRIPTION OF THE DRAWINGS

Advantages of the present invention will be readily appreciated as the same becomes better understood by reference to the following detailed description, considered in connection with the accompanying drawings wherein:

FIG. 7 is a perspective view of the clad cooking vessel engaged with a chain of an endless conveyor;

FIG. 8 is a perspective view of a first exemplary system for cooking food products with a plurality of clad cooking vessels;

FIG. 9 is a side view of the system shown in FIG. 8;

FIG. 10 is a close-up perspective view of the system shown in FIGS. 8 and 9;

FIG. 11 is a close-up side view of the system shown in FIGS. 8-10;

DETAILED DESCRIPTION OF THE EXEMPLARY EMBODIMENT

Figure 1:
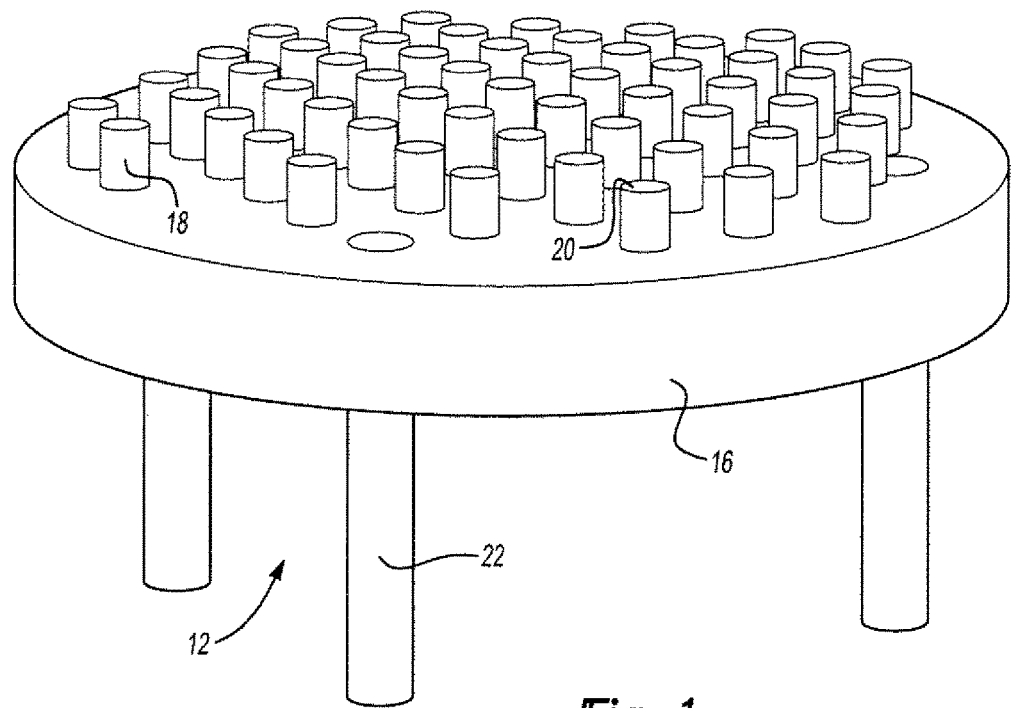
FIG. 1 is a perspective view of a core for a clad cooking vessel.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, most of the features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1-7, a clad cooking vessel is shown in the exemplary embodiment of the invention as a griddle assembly 10. The griddle assembly 10 includes a core 12 and an apron 14. The exemplary core 12 is generally disk-shaped. However, the core 12 can take any shape desired. The shape of the core 12 can correspond to the shape of the food product to be cooked. In the exemplary embodiment of the invention, the food product to be cooked is a circular waffle. The core 12 is formed from a material having a first level of susceptibility to heating by induction. In the exemplary embodiment of the invention, the core 12 is made from iron and is therefore relatively more susceptible to heating by induction. While the core 12 is typically made from iron, more specifically cast iron, the core 12 may be made of any material known in the art.

The exemplary core 12 includes a plate portion 16 and a plurality of protuberances in the form of posts 18. The posts 18 are desirable in the exemplary embodiment of the invention because, as will be set forth below, a cooking surface 24 is defined by the griddle assembly 10. Each of the posts 18 extend from the plate portion 16 to a distal end 20. The posts 18 can all be the same size or can be differently sized. In the exemplary embodiment of the invention, all of the posts 18 are substantially the same size. While the exemplary embodiment includes a plurality of post 18, the post 18 are not necessary and the cooking surface 24 may be flat.

The apron 14 is cast over the core 12. The apron 14 may be cast over the core 12 by any method known in the art, including, but not limited to die casting and investment casting. In the exemplary embodiment, the core 12 is disposed in situ with respect to the apron 14. "In situ" refers to the fact that the apron 14 is integral and substantially surrounds the core 12 such that the core 12 cannot be removed from the apron 14 without deforming or breaking the apron 14. The core 12 is placed in a mold and the apron 14 is dispensed in non-solid form in the mold around the core 12. The apron 14 cools and hardens around the core 12. In situ is the structural aspect of the engagement between the two parts and the casting or molding is the method applied to arrive at the structural aspect. The apron 14 is formed from a material with a second level susceptibility to heating by induction. The second level of susceptibility in the apron 14 is lower than the first level of susceptibility in the core 12. In other words, the apron 14 is less susceptible to heating by induction than the core 12. In the exemplary embodiment of the invention, the apron 14 is formed from aluminum, but may be formed from any material known in the art.

Figure 2:
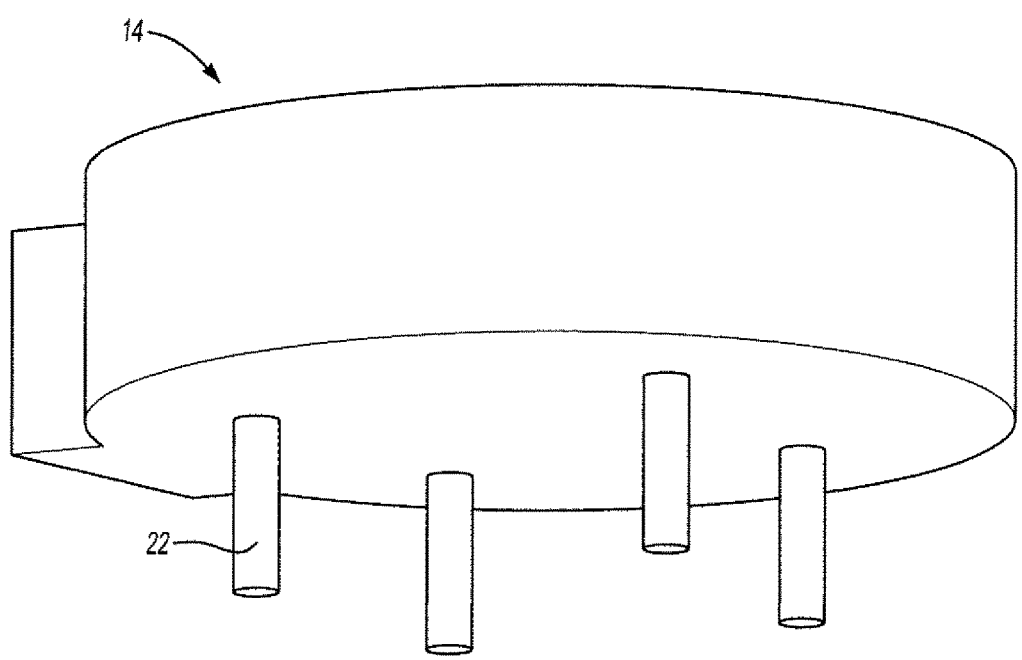
FIG. 2 is a perspective view of an apron of the clad cooking vessel (the core encapsulated by the apron and therefore not visible)
Figure 3:
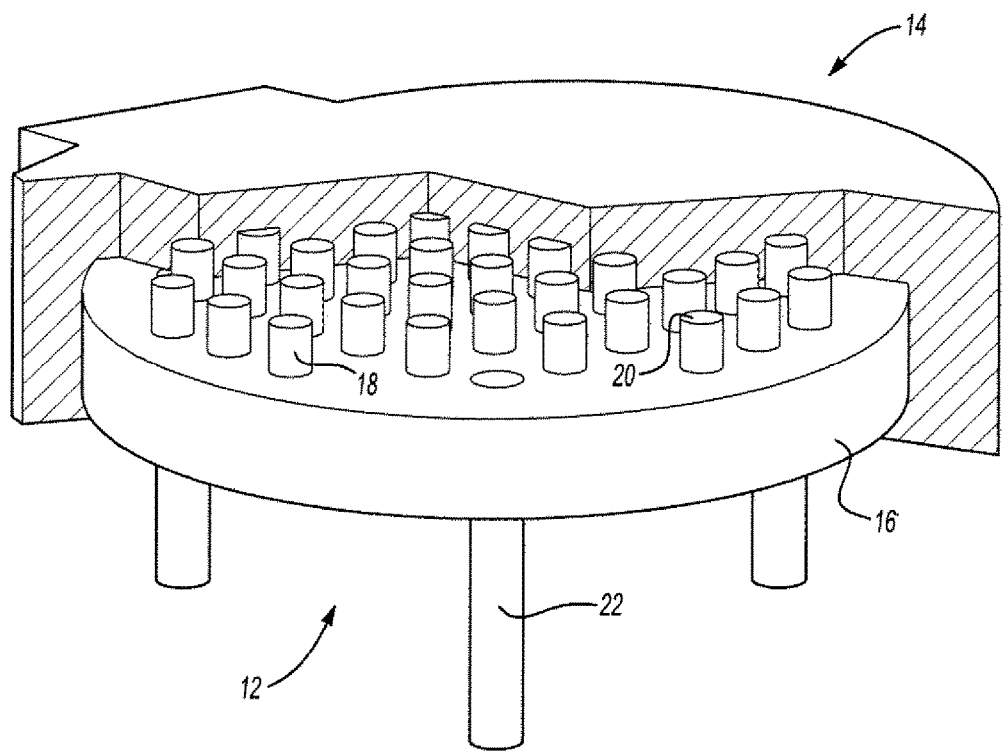
FIG. 3 is a perspective view of the clad cooking vessel with a portion of the apron cut away to reveal the core disposed in situ within the apron.
Figure 4:
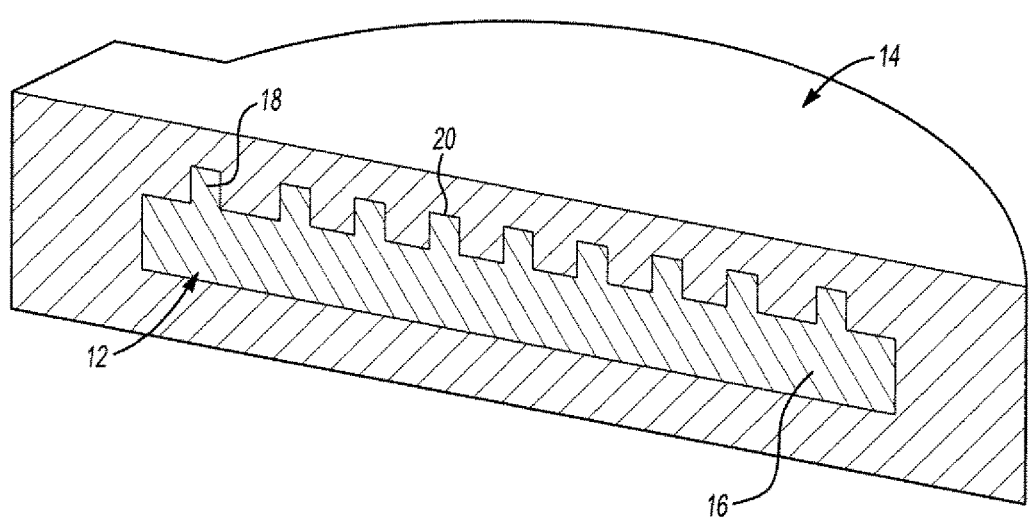
FIG. 4 is a perspective, cross-sectional view of the clad cooking vessel formed by the combined apron and core.
Figure 5:
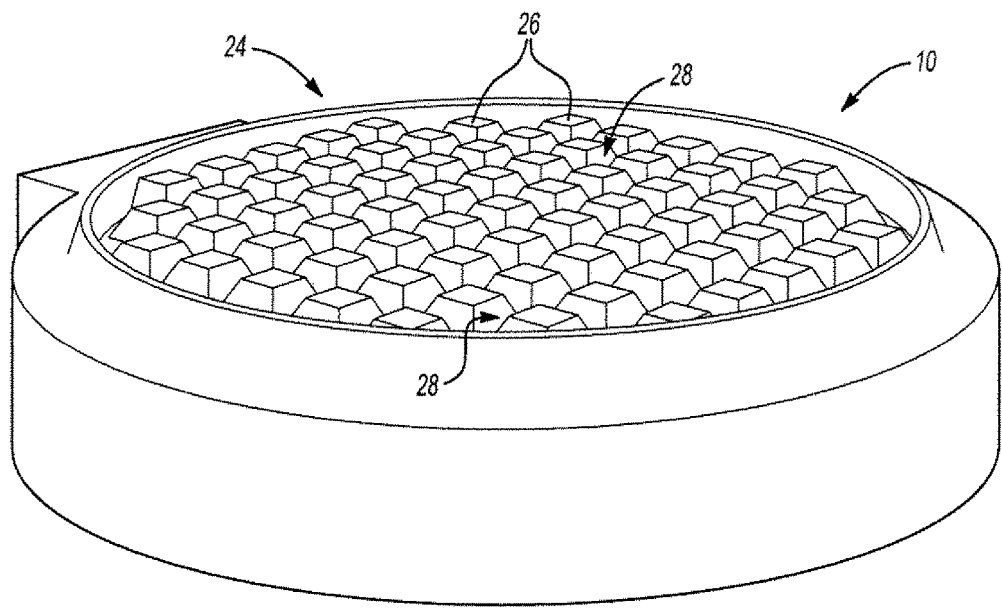
FIG. 5 is a perspective view of the clad cooking vessel wherein the apron has been formed or machined to define a cooking surface with a plurality of lands and grooves.
Figure 6:
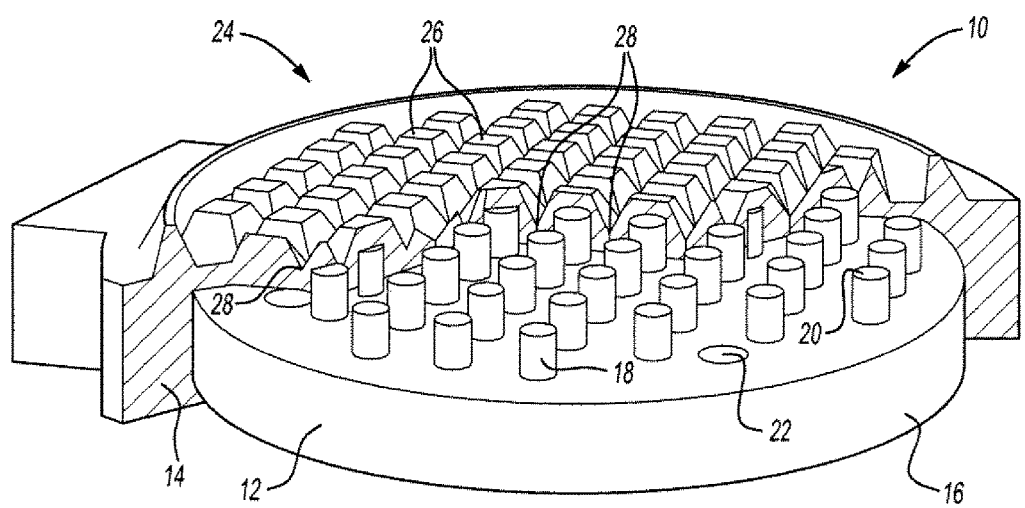
FIG. 6 is a perspective view of the clad cooking vessel with a portion of the apron cut away to reveal the core disposed within the apron.

FIGS. 2-4 show the exemplary apron 14 after the casting operation. In the exemplary embodiment of the invention, the apron 14 is subjected to machining operations to form the cooking surface 24, which is defined by a plurality of lands 26 and grooves 28 as shown in FIG. 5. In alternative embodiments of the invention, the mold in which the apron 14 is cast may be formed with an impression corresponding to the desired cooking surface to obviate post-casting machining. The exemplary cooking surface 24 is a waffle pattern in the exemplary embodiment of the invention. However, other cooking surfaces can be formed by the cooking surface 24, including surfaces that would result in a food product bearing an indicia such as graphics, text, or a combination of text and graphics. The apron 14 could also define a cooking surface that would result in a food product bearing a surface with a partial waffle pattern and also a flat portion. The apron 14 and core 12 could also be square, so that batter cooked on the cooking surface is a square waffle. In an alternative embodiment, as shown in FIG. 6, the apron 14 is cast to be consistent with the plurality of post 18 to define a cooking surface 24 with a plurality of lands 26 and grooves that surround the plurality of post 18.

The core 12 can receive a plurality of locating pins 22 in the exemplary embodiment of the invention. The locating pins 22 can be desirable in practicing the invention to confirm the position of the posts 18 after the apron 14 has been cast over the core 12. The pins 22 can serve as a reference for machining operations such that the lands 26 of the cooking surface 24 are located adjacent the distal ends 20 of posts 18. The locating pins 22 can be removably engaged with the core 12, being removed after machining operations for example.

The structure of the exemplary griddle assembly 10 reduces the likelihood of variation in surface temperature of the cooking surface 24 during cooking. The presence of the posts 18 allows the thickness of the apron 14 (the thickness defined between the core 12 and the cooking surface 24) to be less variable or to be substantially constant over the cooking surface 24. The temperature of the cooking surface 24, and variation of that temperature across the cooking surface 24, can effect the cooking of the food product. For example, food product in the form of batter can be dispensed on the cooking surface 24 and absorb heat. If the thickness of the apron 14 varied relatively greatly, the batter adjacent to thinner portions of the apron 14 could over-cook since the relatively hotter core 12 would be closer to the batter. Conversely, batter adjacent to thicker portions of the apron 14 could under-cook since the relatively hotter core 12 would be further from the batter. The amount of heat transferred through the apron 14 would differ between thicker and thinner portions of the apron 14. Thus, the structure of the exemplary griddle assembly 10 enhances cooking of a food product.

Referring now to FIG. 7, the griddle assembly 10 can be engaged with a system for manufacturing a food product at production speeds. FIG. 7 shows the griddle assembly 10 fixed for movement with a chain 30 of an endless conveyor.

The griddle assembly 10 is mounted to the chain 30 through a mounting arm 32. An insulator member 34 is operably disposed between the arm 32 and the griddle assembly 10 to reduce the likelihood that heat will conduct from the griddle assembly 10 to the chain 30.

A first exemplary system for cooking food products with a plurality of clad cooking vessels is shown in FIGS. 8-13 and 24. The first exemplary system includes a first or top endless conveyor 36a and a second or bottom endless conveyor 38a stacked vertically with respect to one another, as shown by vertical axis 54a. The top conveyor 36a includes a pair of chains 30a, 30b and the bottom conveyor 38a includes a pair of chains 30c, 30d. It is noted that in FIGS. 8-11 portions of the chains 30a, 30b, 30c, 30d are removed to enhance the clarity of the other components.

The endless conveyors 36a, 38a are driven in motion by appropriate driving technology such that the top endless conveyor 36a is driven in a generally clockwise direction (with reference to the perspective shown in FIG. 9) and the bottom endless conveyor 38a is driven in generally counter-clockwise rotation. A plurality of griddle assemblies 10a are engaged with each of the endless conveyors 36a, 38a. The griddle assemblies 10a engaged with the bottom conveyor 38a will hereafter be referred to as the first clad cooking vessel or bottom griddle assemblies 10a and the griddle assemblies 10a engaged with the top conveyor 36a will hereafter be referred to as the second clad cooking vessel or top griddle assemblies 10a.

Figure 24:
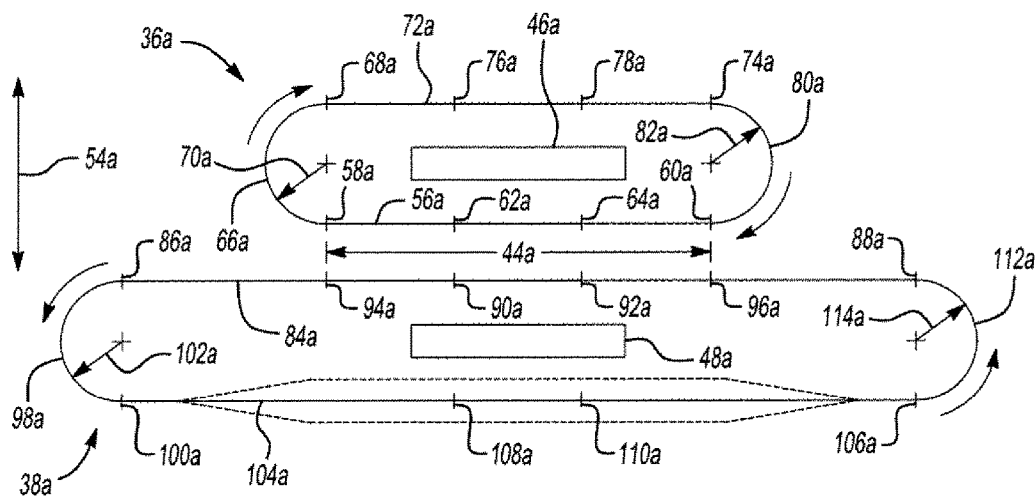
FIG. 24 is a schematic view of the system shown in FIGS. 8-13.

Referring now to FIGS. 9 and 24 particularly, the top and bottom conveyors 36a and 38a are arranged such that a top griddle assembly 10a and a bottom griddle assembly 10a move together along a path 44a. During movement along the path 44a, the top and bottom griddles assemblies 10a are aligned and cooperating to define a mold cavity. The cooking surfaces 24 of the top and bottom griddle assemblies 10a are confronting one another during movement along the path 44a. Batter is dispensed into the bottom griddle assembly 10a by a batter injection device 40a prior to movement along the path 44a; the batter cooks in the mold cavity defined by the aligned and cooperating top and bottom griddle assemblies 10a during movement along the path 44a.

At least one induction coil is disposed along the path 44a. In the exemplary embodiment, first and second induction coils 46a, 48a are disposed along the path 44a to generate a magnetic field and induce heating of both the top and bottom griddle assemblies 10a to cook the food product. The induction coil 46a is disposed above the length 44a and induces heating of the top griddle assemblies 10a engaged with the conveyor 36a. The induction coil 48a is disposed below the length 44a and induces heating of the bottom griddle assemblies 10a engaged with the conveyor 38a. While in the exemplary heat is generated by use of the induction coil, it should be noted that a hybrid oven, such as an oven with direct fire via a gas burner or any other oven known in the art may be used in addition to the induction coil.

The configuration and operation of the conveyors 36a and 38a, as well as the configuration of the coils 46a and 48a can be selected and adjusted to enhance the cooking of the food product. These structures will therefore be discussed in greater detail. FIG. 24 shows schematic representations of the conveyors 36a, 38a and of the coils 46a, 48a. The top conveyor 36a includes a first segment 56a that extends between points 58a and 60a. The first segment 56a of the conveyor 36a extends parallel to the path 44a. The griddle assemblies 10a engaged with the conveyor 36a are heated by the induction coil 46a along a portion of the first segment 56a, between points 62a and 64a. The top conveyor 36a also includes a first turn 66a between point 58a and a point 68a. The arc of the first turn 66a is defined by a radius 70a. The top conveyor also includes a second segment 72a that extends between point 68a and a point 74a. The second segment 72a of the conveyor 36a extends parallel to the path 44a. The griddle assemblies 10a engaged with the conveyor 36a are heated by the induction coil 46a along a portion of the second segment 72a, between points 76a and 78a. The top conveyor 36a also includes a second turn 80a between point 74a and point 60a. The arc of the second turn 80a is defined by a radius 82a.

The bottom conveyor 38a includes a first segment 84a that extends between points 86a and 88a. The first segment 84a of the conveyor 38a extends parallel to the path 44a between points 94a and 96a. The griddle assemblies 10a engaged with the conveyor 38a are heated by the induction coil 48a along a portion of the first segment 84a, between points 90a and 92a. The top conveyor 38a also includes a first turn 98a between point 86a and a point 100a. The arc of the first turn 98a is defined by a radius 102a. The top conveyor also includes a second segment 104a that extends between point 100a and a point 106a. The griddle assemblies 10a engaged with the conveyor 38a are heated by the induction coil 48a along a portion of the second segment 104a, between points 108a and 110a. The top conveyor 38a also includes a second turn 112a between point 106a and point 88a. The arc of the second turn 112a is defined by a radius 114a.

The induction coil 46a extends a length parallel to the path 44a. The length of the coil 46a is at least equal to the distance between points 62a and 64a. The coil 46a is disposed a distance from the segment 56a equal to a distance from the segment 72a, thus centered between the segments 56a and 72a. The induction coil 48a extends a length parallel to the path 44a. The length of the coil 48a is at least equal to the distance between points 90a and 92a. The coil 48a is disposed a distance from the segment 84a equal to a distance from the second segment 104a, thus centered between the segments 84a and 104a.

The configuration of one or both of the conveyors 36a and 38a can be selected and/or adjusted to enhance the cooking of the food product. In the exemplary embodiment, the griddle assemblies 10a will pass the induction coil twice. Once with a food product disposed therein for heating along the path 44a, and a second time as the empty griddle assembly returns to the batter injection device 40a. This second pass acts over the induction coil acts as a preheater for the griddle assemblies 10a. In production, each of the cooking surfaces 24 of the griddle assemblies 10a will stay at a temperature above room temperature. The assembly may be adjusted to based on the desired preheating and heating of the griddle assemblies 10a. For example, if it is found that the griddle assemblies 10a are too hot at the starting point of the path 44a, the lengths of segments can be increased so that the griddle assemblies 10a will spend more time away from the induction coils 46a, 48a. Similarly, the radii of one or more of the turns can be increased. The straightness of any segment can be changed to a non-straight path. Variations can also be made if it is found that the griddle assemblies are not sufficiently hot at the starting point of the path 44a. The extent that one or more segments are parallel to the path can be changed. The proximity of any segment to one of the coils can be changed, as well as the equidistant positioning of either coil between two segments. FIG. 24 shows possible changes to the conveyor 38a in phantom lines as examples of configuration modifications.

The phantom line above the segment 104a may be desirable to increase the amount of heat generated in griddle assemblies 10a since the bottom griddle assemblies 10b would pass more fully within the strongest portions of the magnetic field. The phantom line below the segment 104a may be desirable to decrease the amount of heat generated in griddle assemblies 10a since the bottom griddle assemblies 10b would pass less fully within the magnetic field. Any combination of these variables can be changed to enhance the heating of the griddle assemblies and thereby enhance the cooking of the food product.

Supplemental structures can be disposed along the conveyors 36a, 38a if desired. For example, cooling fans can be disposed at one or more locations along one of both conveyors 36a, 38a to enhance the control of the temperatures of the griddle assemblies 10a and temperatures of the chains 30a, 30b, 30c, 30d of the conveyors 36a, 38a. As shown best in FIGS. 8, 10 and 12-13, each griddle assembly 10a is engaged with two chains through two mounting arms 32a and the length of the mounting arms 32a can also be varied to increase the distance between the chains 30a, 30b, 30c, 30d and the coils 46a 48a and thereby reduce the likelihood of undesirable heating of the chains 30a, 30b, 30c, 30d.

The operation of one or both of the conveyors 36a and 38a can be selected and/or adjusted to enhance the cooking of the food product. For example, the speed of rotation of the conveyors 36a, 38a can be varied. Also, the griddle assemblies 10a may be permitted to partially float relative to the chains. In other words, the griddle assemblies may be allowed to accumulate at some point along the segments and the turns, catching on the chains at timed intervals for relatively high-speed passage by induction coils.

The configuration of one or both of the coils 46a and 48a can be selected and adjusted to enhance the cooking of the food product. The distance between points 62a and 64a corresponds to the length of the induction coil 46a. The exemplary induction coil 46a thus extends only partially along the length 44a and the top and bottom griddle assemblies. However, in alternative embodiments of the invention, one or both of the coils 46a, 48a could extend along the entire path 44a.

The operation of one or both of the coils 46a and 48a can be selected and adjusted to enhance the cooking of the food product. It may be desirable to increase or decreasing the strength of the magnetic fields generated by one or both of the coils 46a, 48a. For example, it may be desirable to generate a stronger magnetic field with the coil 48a since the raw batter is received in griddle assemblies 10a of the conveyor 38a.

Figure 12:
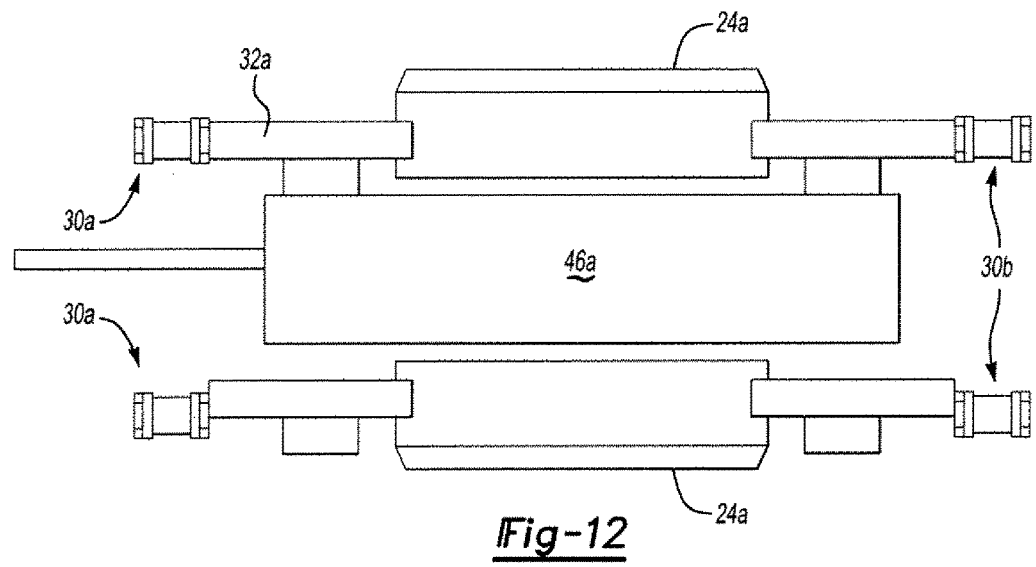
FIG. 12 is a close-up view of the system shown in FIGS. 8-11 from a perspective along the path of movement of the clad cooking vessels, showing an induction coil positioned between two clad cooking vessels.
Figure 13:
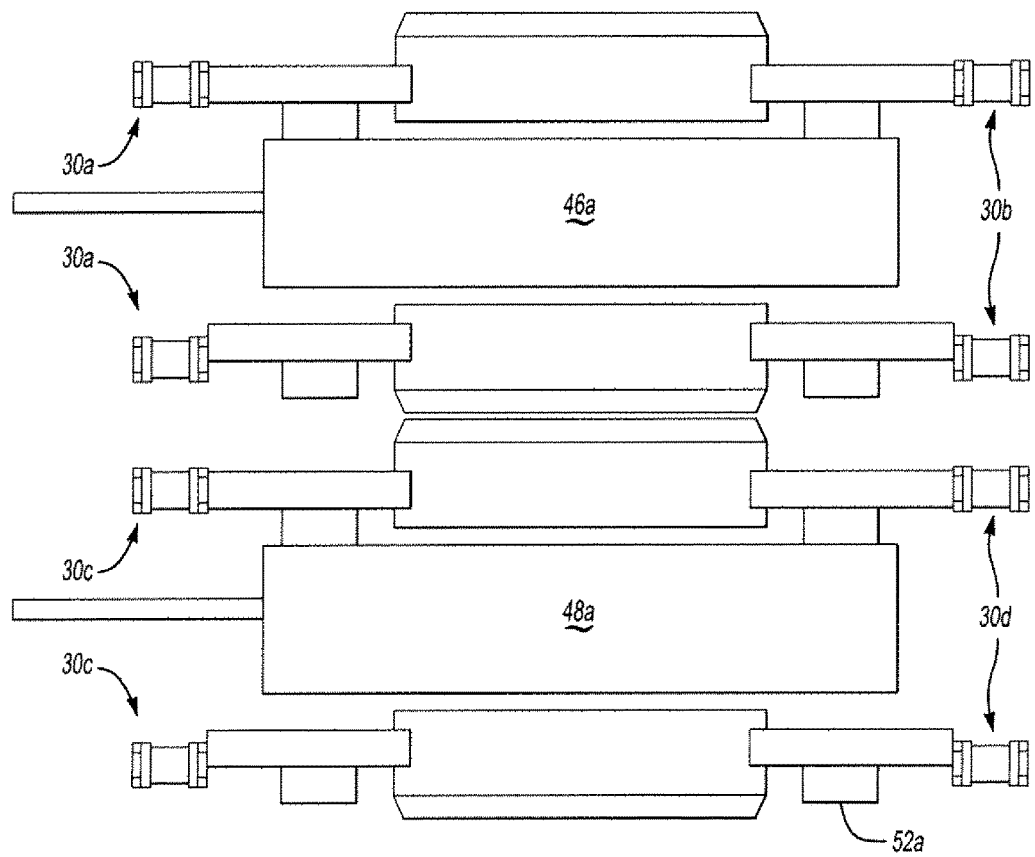
FIG. 13 is a close-up view of the system shown in FIGS. 8-12 from a perspective along the path of movement of the clad cooking vessels, showing a plurality of induction coils and a plurality of clad cooking vessels.
Figure 14:
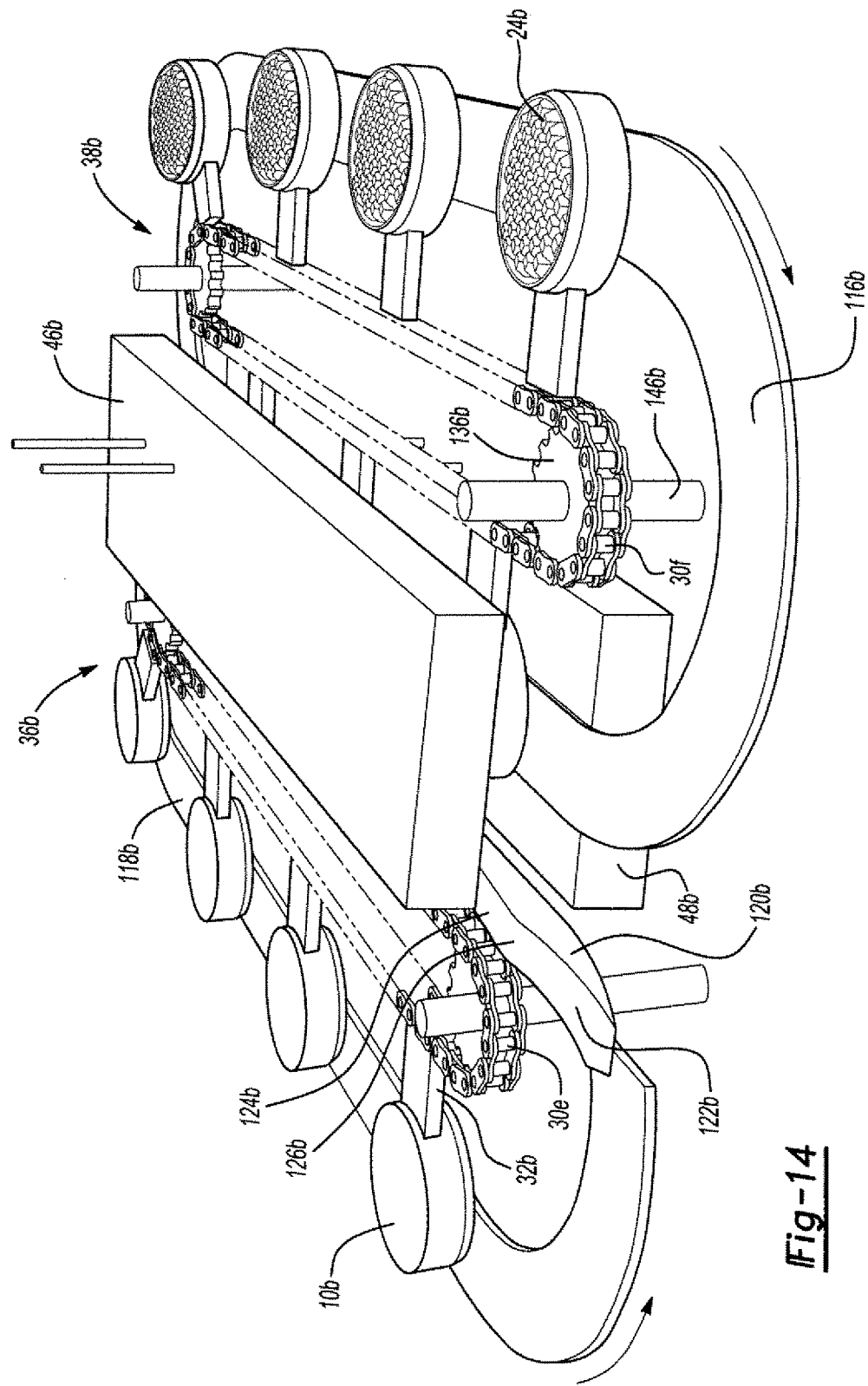
FIG. 14 is a perspective view of a second exemplary system for cooking food products with a plurality of clad cooking vessels.
Figure 15:
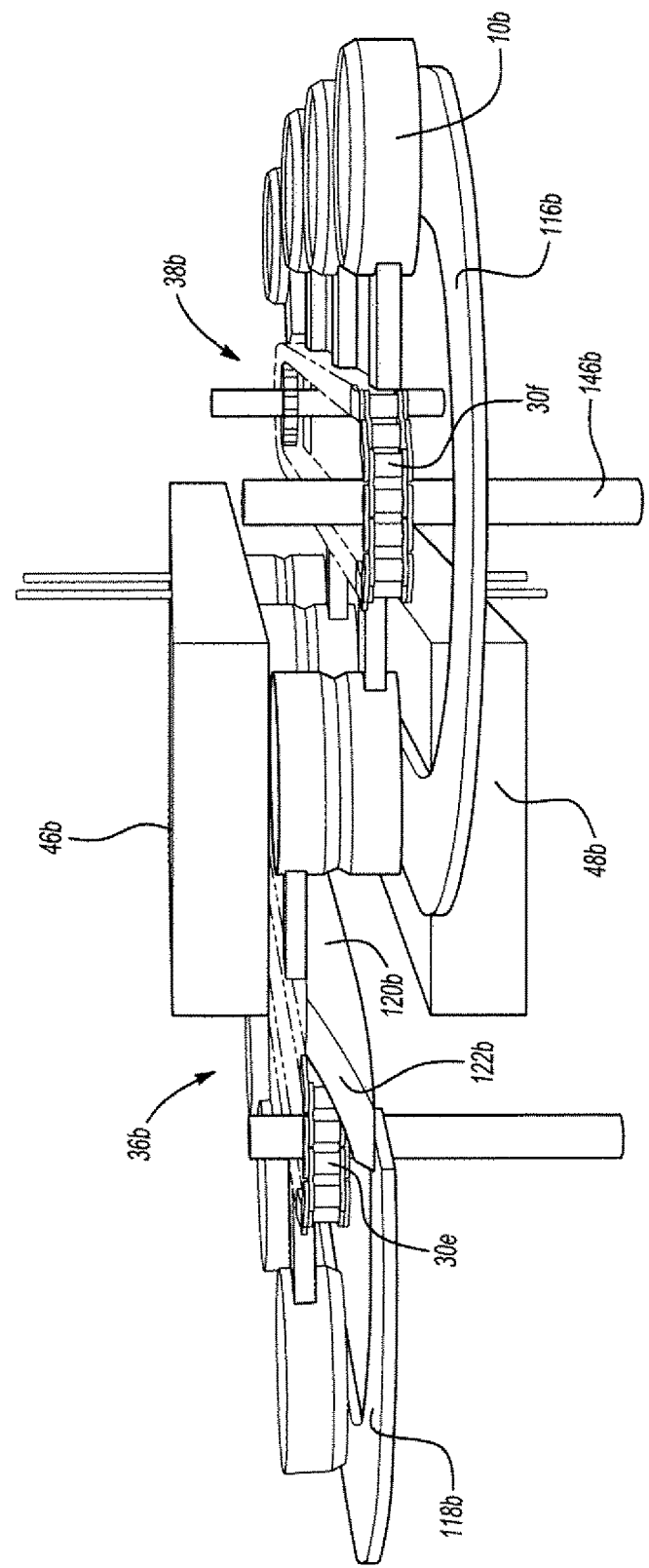
FIG. 15 is a second perspective view of the system shown in FIG. 14.
Figure 16:
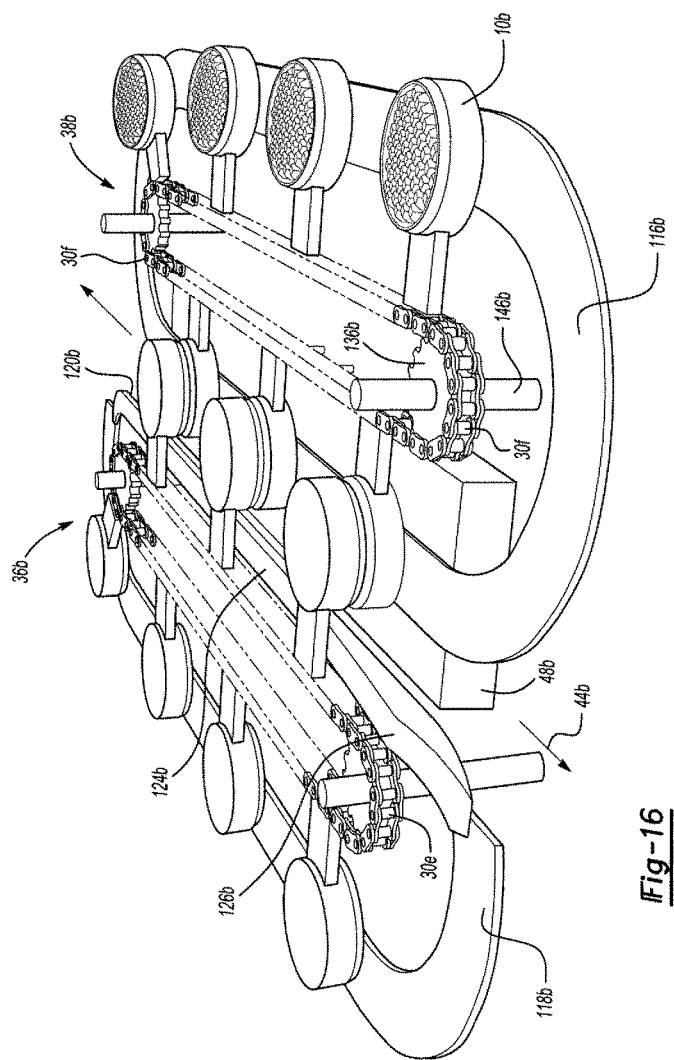
FIG. 16 is a third perspective view of the system shown in FIGS. 14 and 15 with an induction coil removed to better illustrate the remaining components.
Figure 17:
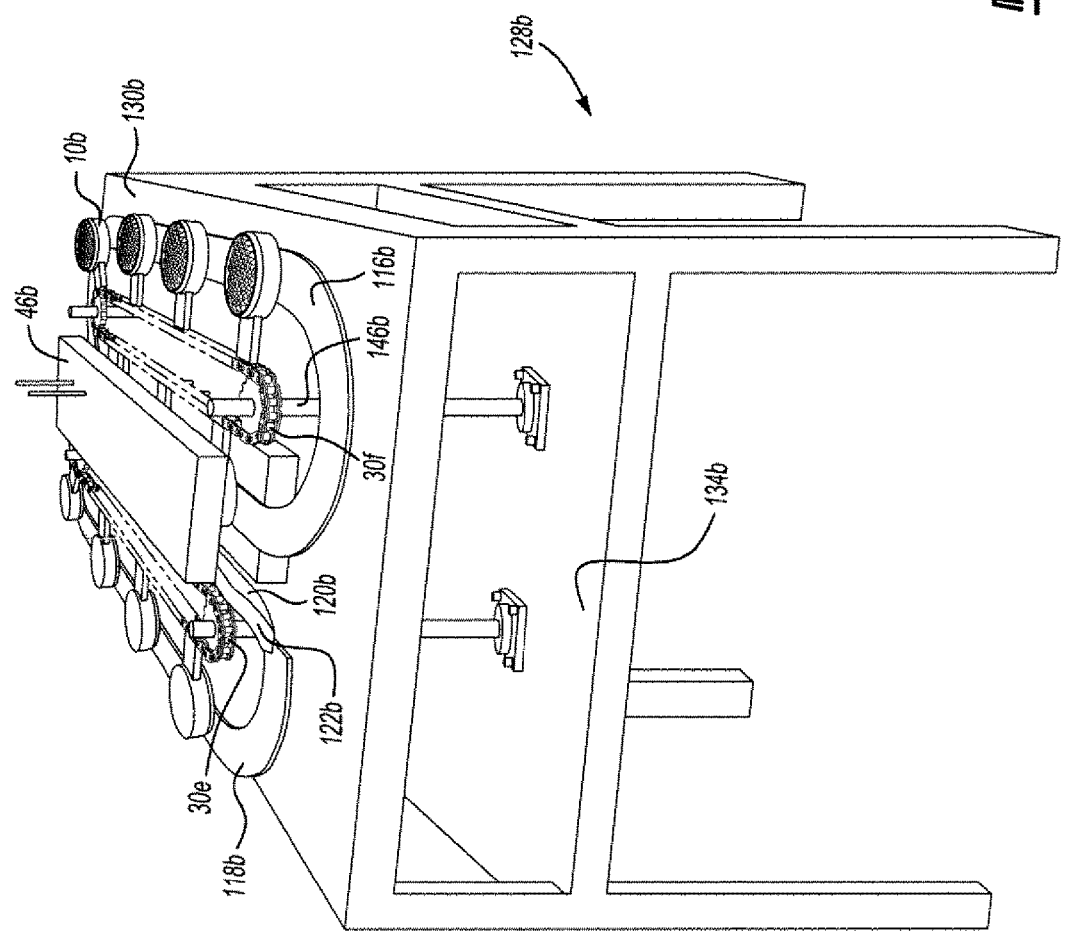
FIG. 17 is a perspective view of the system shown in FIGS. 14-16 wherein the system is mounted on a fixture.
Figure 18:
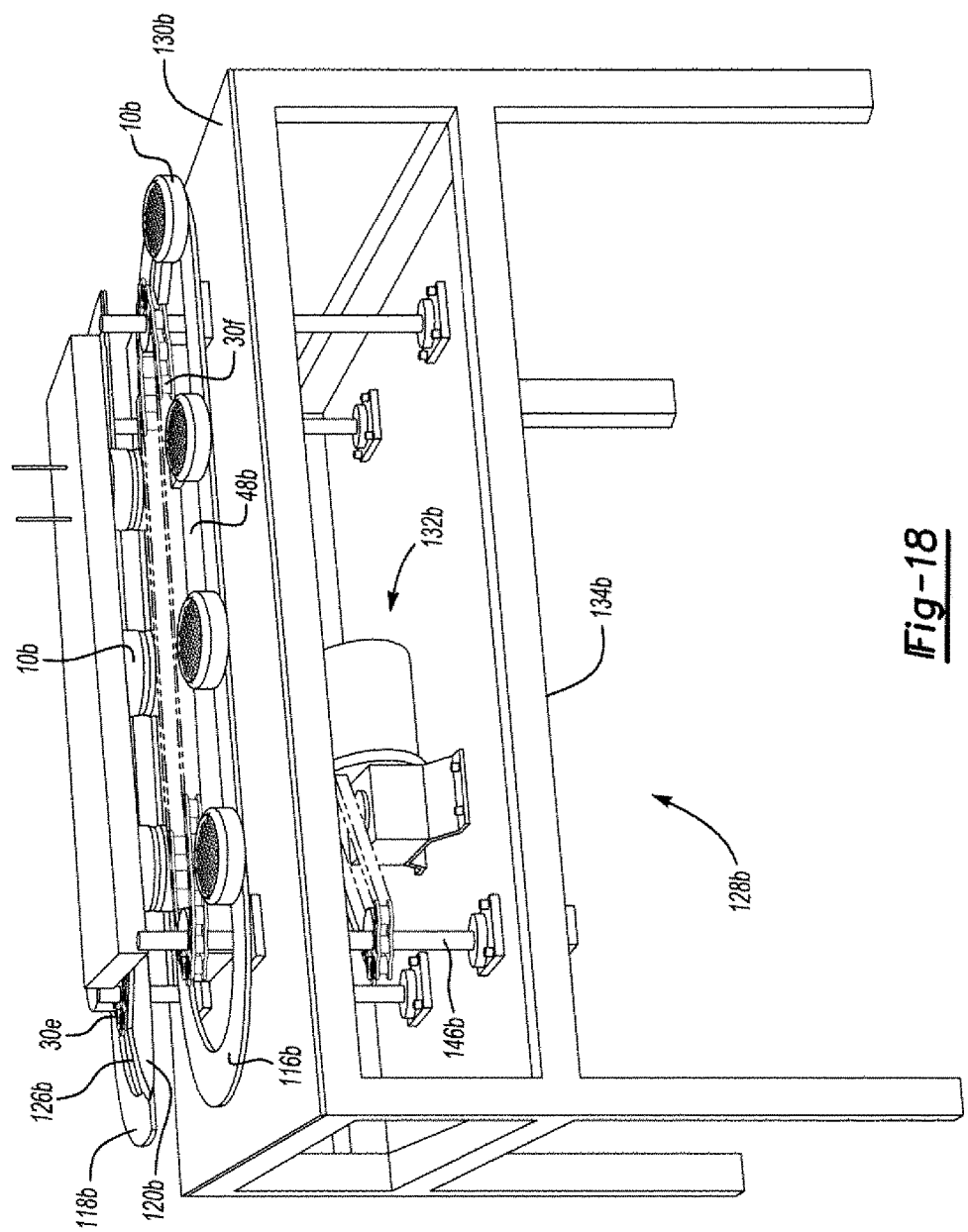
FIG. 18 is a second perspective view of the structures shown in FIG. 17.
Figure 19:
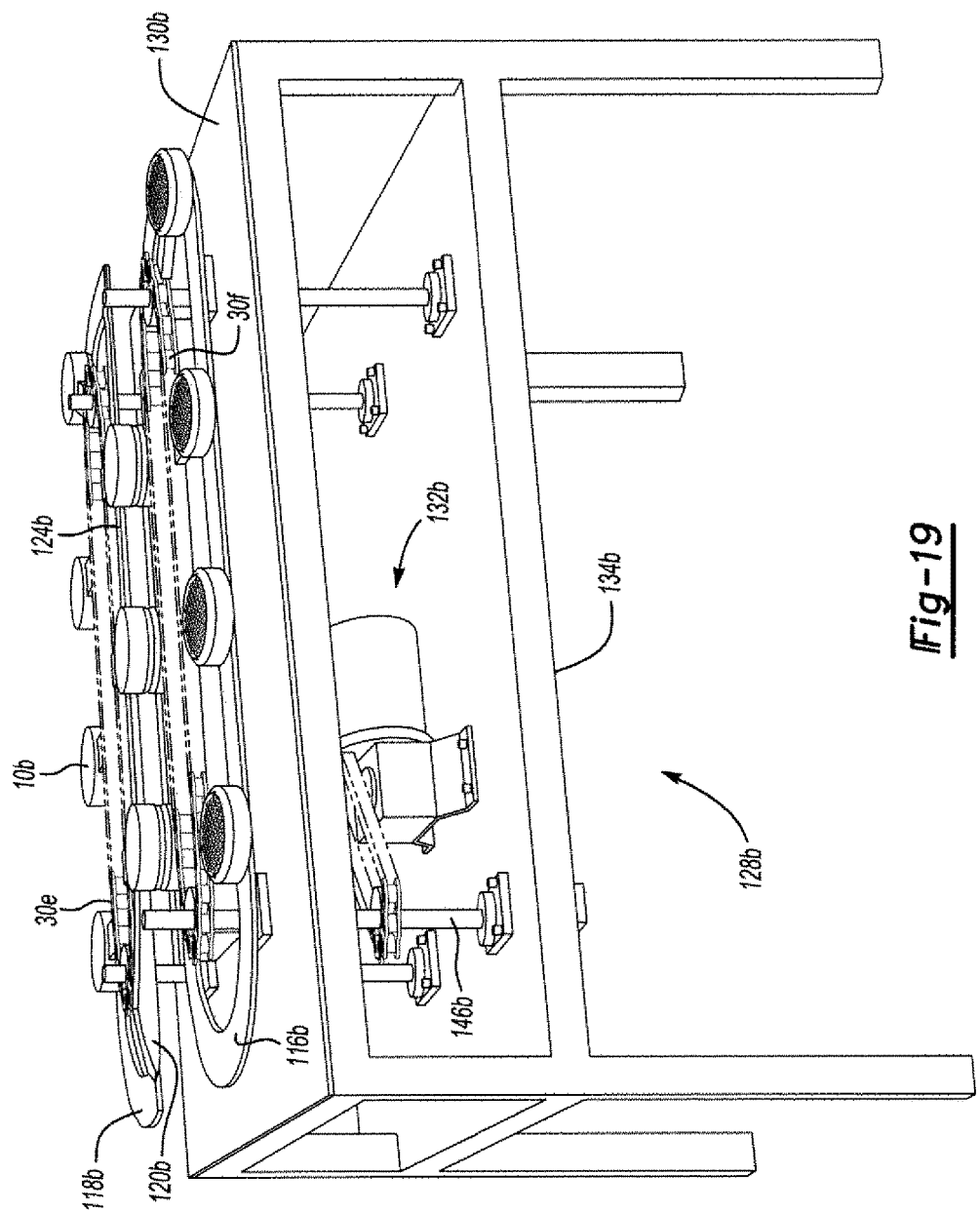
FIG. 19 is a third perspective view of the structures shown in FIGS. 17 and 18.
Figure 20:
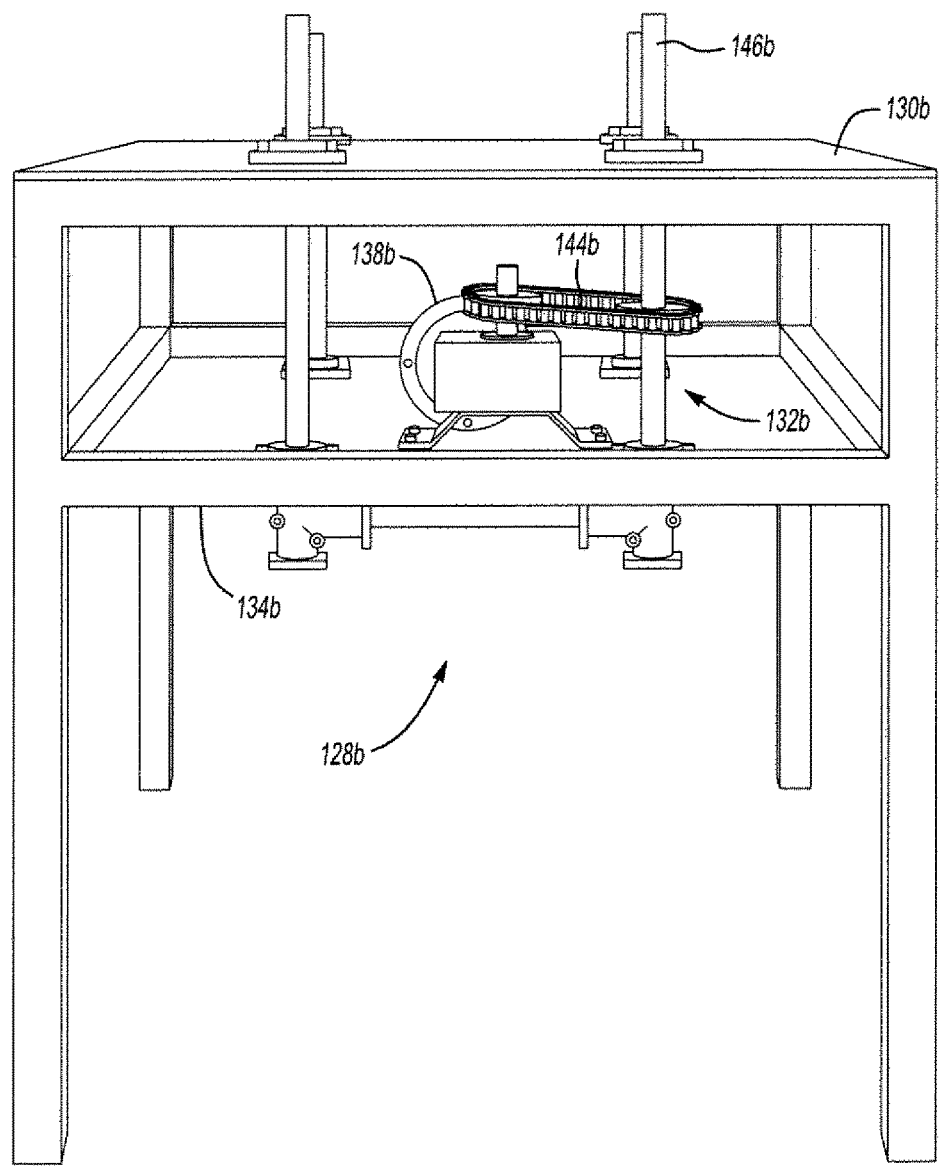
FIG. 20 is a perspective view of the fixture shown in FIGS. 17-19.
Figure 21:
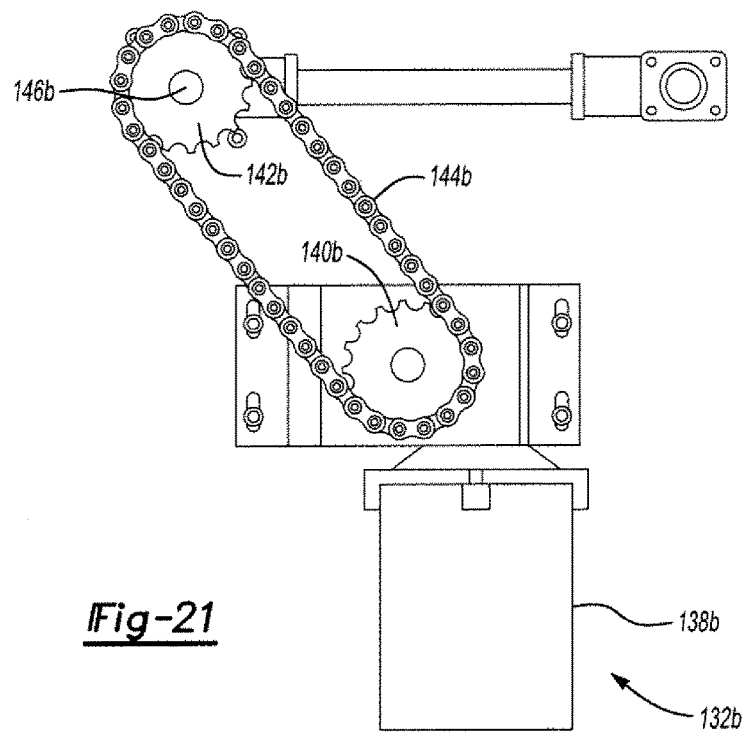
FIG. 21 is a top view of a drive assembly for the system shown in FIGS. 14-16.
Figure 22:
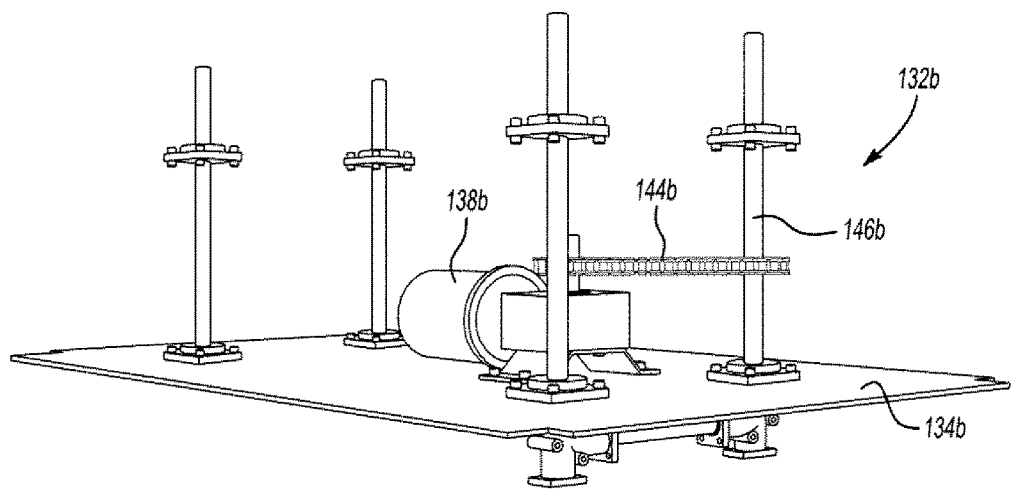
FIG. 22 is a perspective view of the drive system shown in FIG. 21 and a portion of the fixture shown in FIGS. 17-20.

The alignment and cooperation of the top and bottom griddle assemblies 10a moving together along the path 44a can be enhanced with one or more alignment bars, such as, for example, an alignment bar 52a. Each of the alignment bars 52a can cooperate in a cam-cam follower relationship with one of the mounting arms 32a extending from the griddle assembly 10a. The alignment bars 52a and mounting arm 32a can cooperate to precisely position the griddle assemblies 10a relative to one another and also relative to the induction coils 46a and 48a. As best shown in FIGS. 12 and 13 the griddle assembly 10a and associated mounting arms 32a can move vertically relative to the respective chain to further enhance alignment between the top and bottom griddle assemblies 10a.

FIGS. 14-19 illustrate a second system for cooking food products with a plurality of clad cooking vessels. The second system includes first and second endless conveyors 36b, 38b disposed horizontally with respect to one another. The first conveyor 36b includes a chain 30e and the conveyor 38b includes a chains 30f. The second system also includes two induction coils 46b, 48b. The two induction coils 46b, 48b are vertically spaced from one another to define a gap therebetween. The first segments of said first and second paths overlapping within the gap as discussed in greater detail below.

Griddle assemblies 10b extend cantilevered from the chains 30e and 30f through mounting arms 32b. The griddle assemblies 10b engaged with the conveyor 38b are supported against gravity by a plate 116b along the entire length of movement around the conveyor 38b. The plate 116b can present a bearing surface to the griddle assemblies 10b and/or roller elements can be disposed between each of the griddle assemblies 10b and the plate 116b to reduce friction. The griddle assemblies 10b engaged with the conveyor 36b are supported against gravity along a portion of movement by a plate 118b. The plate 118b can present a bearing surface to the griddle assemblies 10b and/or roller elements can be disposed between each of the griddle assemblies 10b and the plate 118b to reduce friction. The plate 118b is spaced vertically higher than the plate 116b.

Along the remainder of the length of movement defined by the conveyor 36b, the griddle assemblies 10b are guided in movement by a cam 120b extending parallel to the path 44b. The cam 120b includes a cam surface with a first portion 122b and a second portion 124b. The portions 122b, 124b intersect and blend at a crest 126b. As a top griddle assembly 10b engaged with the conveyor 36b rounds a turn of the conveyor 36b, the mounting arm 32b engages the first portion 122b. The mounting arm 32b rides up the first portion 122b, pivoting about the intersection between the mounting arm 32b and the chain 30e and lifting the top griddle assembly 10b upward. The mounting arm 32b thus acts as a cam follower and climbs up the first portion 122b to the crest 126b. At that point, the bottom griddle assembly 10b engaged with the conveyor 38b is disposed below the top griddle assembly 10b at the crest 126b. Top and bottom griddle assemblies 10b are now aligned and move together along the path 44b. During movement from the crest 126b along the surface portion 124b, the mounting arm 32b rides the second portion 124b and lowers the top griddle assembly 10b to cover the cooking surface 24b of the bottom griddle assembly 10b engaged with the conveyor 38b.

FIGS. 14-22 illustrate an exemplary fixture and drive system. The fixture 128b includes a first planar member 130b for supporting the conveyors 36b, 38b. A drive system 132b is supported by a second planar member 134b of the fixture 128b. The exemplary drive system 132b drives the conveyor 38b; a similar or different system can be applied to move the conveyor 36b. The drive system 132b is coupled to a sprocket 136b engaged with the chain 30f and includes a motor 138b, sprockets 140b, 142b, and a chain 144b. The motor 138b drives the sprocket 140b in rotation. The sprocket 140b is coupled to the sprocket 142b with the chain 144b, so rotation of the sprocket 140b results in rotation of the sprocket 142b. The sprocket 142b is fixed to a shaft 146b. The sprocket 136b is also fixed to the shaft 146b, so rotation of the sprocket 142b results in rotation of the sprocket 136b. Electronic controls (not shown) can be applied to control the drive system 132b as well as any system implemented for moving the conveyor 36b.

Figure 23:
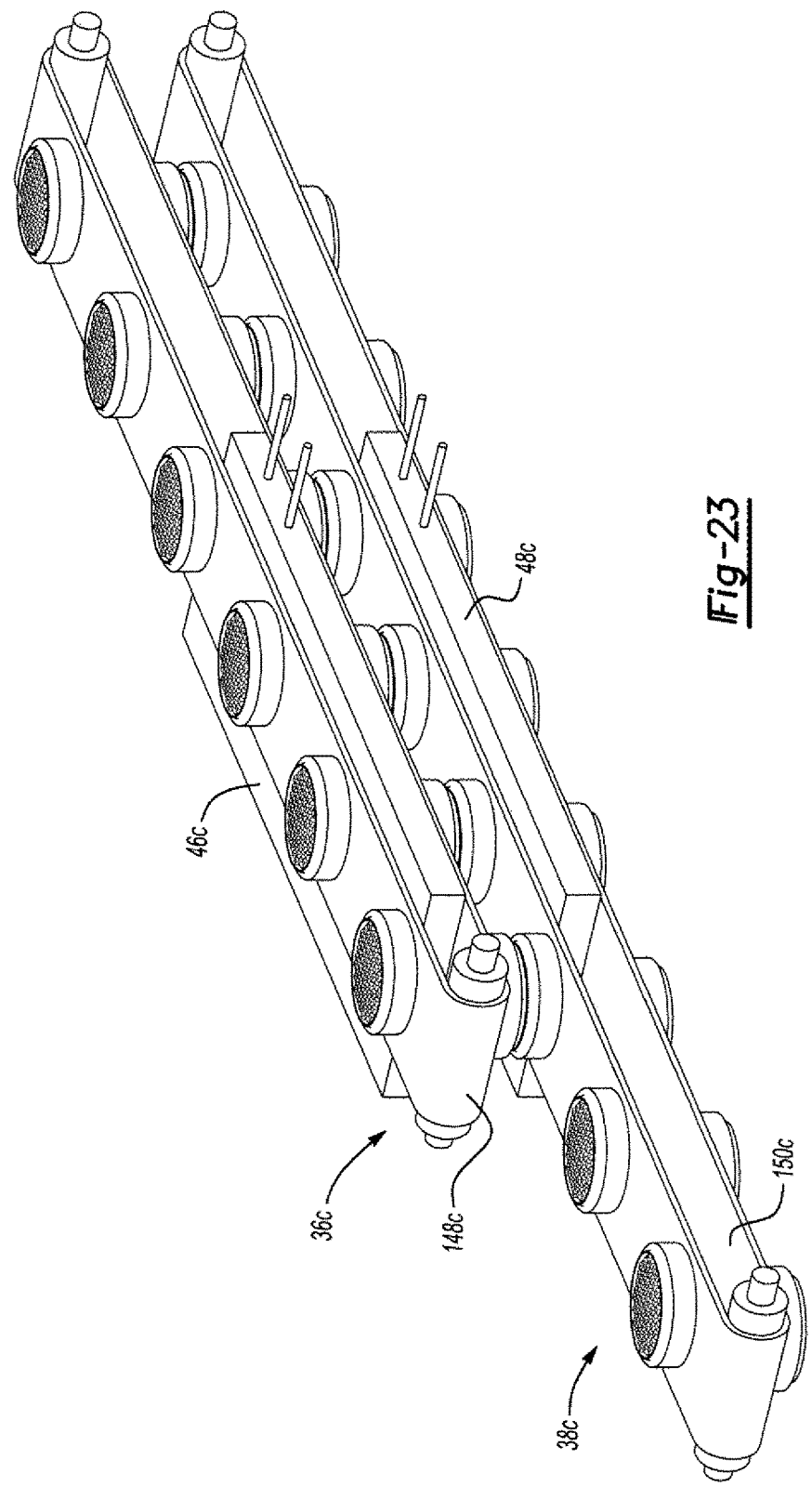
FIG. 23 is a perspective view of a third exemplary system for cooking food products with a plurality of clad cooking vessels.

FIG. 23 illustrates a third exemplary system for cooking food products with a plurality of clad cooking vessels. The third system includes first and second endless conveyors 36c, 38c stacked vertically with respect to one another. The first conveyor 36c includes a belt 148c and the conveyor 38c includes a belt 150c. The plurality of clad cooking vessels are secured to the belt for movement therewith. The second system also includes two induction coils 46c, 48c. The belts 148c, 150c may be formed from a composite material that can withstand temperatures of about 600° F.-700° F. or any other material known in the art. A composite material may be used because the heat produced in through induction heating is concentrated toward the cooking surface of the clad cooking vessel. In the exemplary embodiment, the belts 148e, 150c have a width to accommodate plurality of clad cooking vessel one after another. In an alternative embodiment, the belts 148c, 150e may have an increased width so that multiple clad cooking vessels can be placed in a row.

Figure 30:
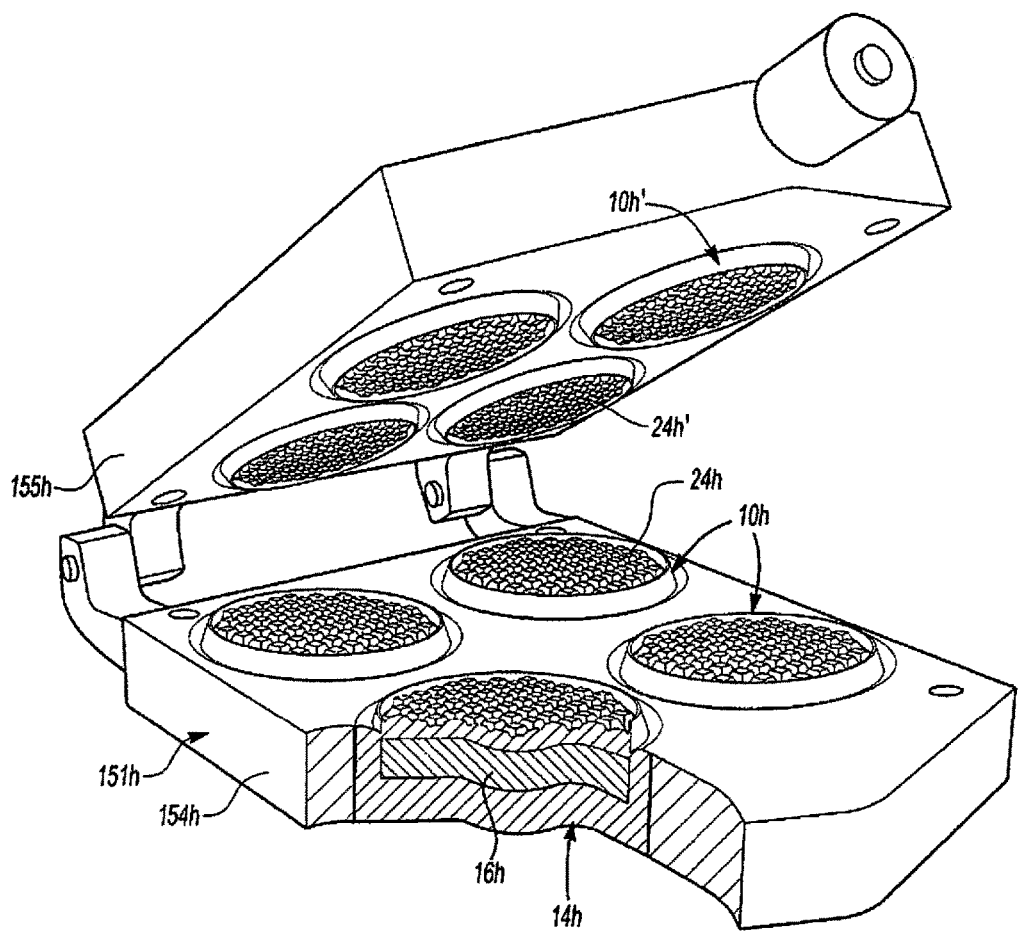
FIG. 30 is a partial perspective view a plurality of clad cooking vessels of an alternative embodiment of the invention disposed in a casing.

FIG. 30 illustrates yet another exemplary embodiment for cooking food products. The exemplary embodiment includes a plurality of griddles assemblies 10h that are disposed in a carrier 151h. The griddle assemblies 10h are produced as described above. The carrier 151h may be formed from a composite material that can withstand temperatures of about 600° F.-700° F. or any other material known in the art. A composite material may be used because the heat produced in through induction heating is concentrated toward the cooking surface 24h. In the exemplary embodiment, the cooking surface 24h of the griddle assembly 10h is a waffle shape, but may be any desired shape. An advantage of the present embodiment is that the griddle assemblies 10h are removable so that the griddle assemblies 10h are easily changeable.

A plurality of carriers 151h may be used in production of the food product. The carriers 151h may be utilized in any of the systems described herein or any other system known in the art. For example, the carriers 151h may be used with the chain or belt conveyor system. In an exemplary embodiment, at least one carrier 151h is disposed on a conveyor. The carrier has a lower portion 154h and an upper portion 155h linked to the lower portion and movable between an open position and a closed position. The upper portion 155h of the carrier is hinged to the lower portion to be movable from about 0°-180° relative to the lower portion. When the upper portion is positioned 0° relative to the lower portion, the carrier is in the closed position. When the upper portion is positioned a location greater that 0° relative to the lower portion, the carrier is in the open position. At least one first clad cooking vessel 10h is disposed in the lower portion 154h of the carrier 151h to define a first cooking surface 24h for receiving a quantity of uncooked food product to be cooked. At least one second clad cooking vessel 10h' disposed in the upper portion 155h of the carrier 151h to define a second cooking surface 24h' for operably engaging the quantity of uncooked food product to be cooked while in the closed position. At least one heating system is disposed proximate the conveyor to heat the first and second cooking vessels in the carrier. The heating system includes an induction coil as previously discussed herein.

Numerous kinds of food products can be produced using a cooking vessel and/or production system incorporating the disclosure herein. The invention is not limited to food products made with batter, and may include any food product that requires heat to cook, bake or toast. In an alternative embodiment, the cooking vessel and/or production system may be used to produce a dough based food product. The dough used includes, but is not limited to, cracker dough, cookie dough, cereal dough, bread dough and pretzel dough. The dough used in the present invention can be any type of edible dough, including, for example, laminated or non-laminated dough, dough with sweeteners added, dough that are leavened, dough that have been fermented, dough with flavorings and dough with inclusions or toppings. The batter food product or the dough food product may also be filled.

Figure 25:
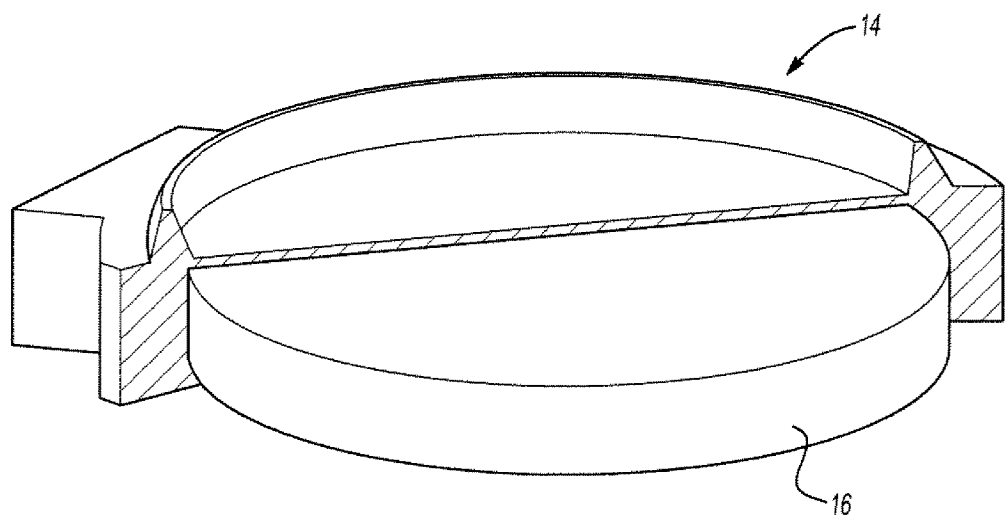
FIG. 25 is a perspective view of an alternative clad cooking vessel with a flat cooking surface and a core that is without protuberances.

The griddle assembly 10 is shown bearing a waffle griddle cooking surface 24, so batter cooked on the surface 24 will be in the shape of a waffle. However, the invention is not limited to waffles. A first alternative cooking surface could be flat so that batter cooked on the surface will be in the shape of a pancake. FIG. 25 shows an alternative griddle assembly 10d with a flat cooking surface 24d and a core 12d that is without protuberances. A second alternative cooking surface could be shaped like the mold shown in U.S. Pat. No. 6,013,300 so that batter cooked on the surface will be in the shape of a slice of bread. Similarly, the invention is not limited by batter mixtures, cooking times and/or cooking temperatures. The '300 patent discloses several examples for making quick bread; all of these examples could be produced with a cooking vessel and/or production system as disclosed herein. Therefore, for the limited purpose of providing examples of batter mixtures, cooking times and cooking temperatures, the '300 patent is incorporated by reference herein. Likewise, any waffle and/or pancake batters known in the art can be cooked with cooking vessel and/or production system as disclosed herein.

Figure 26:
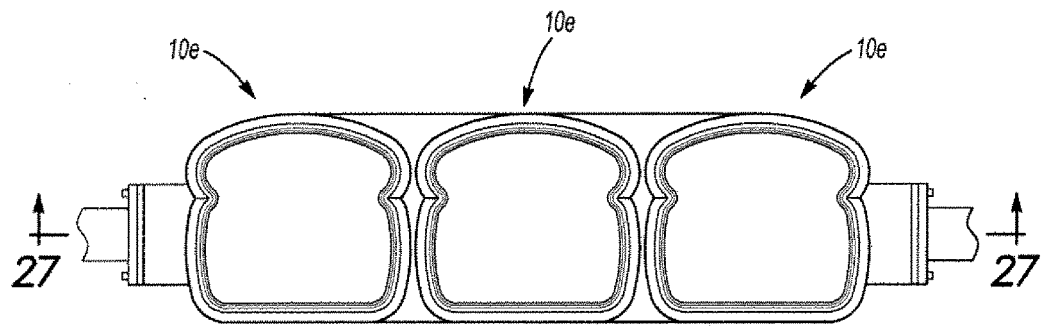
FIG. 26 is a top view of alternative clad cooking vessel grouped together for movement side-by-side along a production line for producing edible products.
Figure 27:
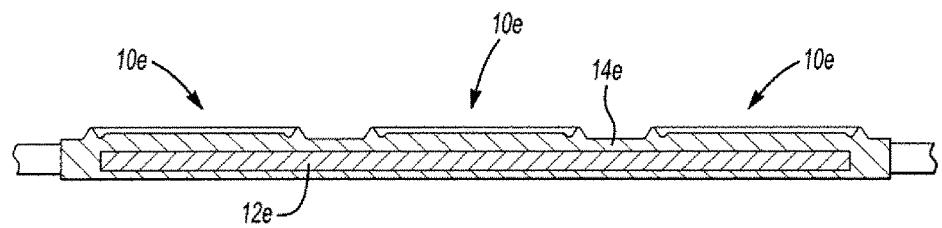
FIG. 27 is a cross-section taken along section lines 27-27 in FIG. 26.
Figure 28:
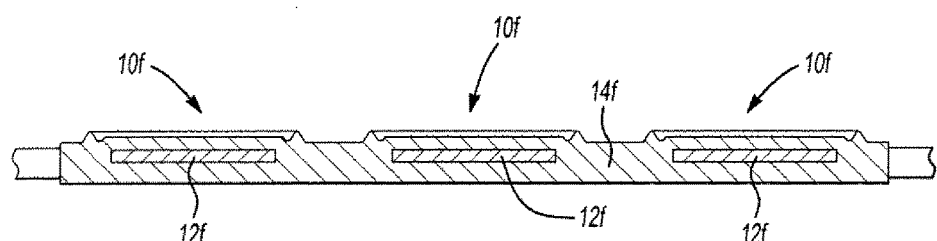
FIG. 28 is a cross-section of an alternative embodiment of the invention and is analogous to the cross-section shown in FIG. 27.
Figure 29:
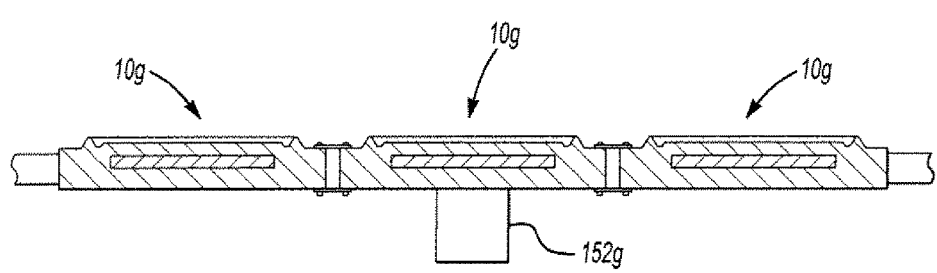
FIG. 29 is a cross-section of an alternative embodiment of the invention and is analogous to the cross-sections shown in FIGS. 27 and 28.

The invention can also be practiced wherein a plurality of griddle assemblies are moved together, side-by-side, along a production path. FIG. 26 shows griddle assemblies 10e grouped together for movement along a production line for producing edible products. The griddle assemblies 10e are shaped to cook quick bread. However, each griddle assembly 10e could be shaped to cook differently-shaped food products. For example, one of the griddle assemblies 10e could be flat to cook batter into the shape of a pancake, another griddle assembly 10e could bear a waffle pattern to cook batter into the shape of a waffle, and the third griddle assembly 10 could bear the outline of a slice of bread to cook batter into the shape of quick bread. FIG. 27 is a cross-section taken along section lines 27-27 in FIG. 26. The griddle assemblies 10e are integrally formed with one another. Alternative embodiments of the invention may have less or more than three griddle assemblies disposed side-by-side. The three griddle assemblies 10e share a common core 12e and a common apron 14e. FIG. 28 shows an alternative embodiment of the invention and is a cross-section analogous to the cross-section shown in FIG. 27. In FIG. 28, three griddle assemblies 10f are integral and share a common apron 14f. However, each griddle assembly 10f includes a separate of dedicated core 12f. FIG. 29 shows an alternative embodiment of the invention and is a cross-section analogous to the cross-sections shown in FIGS. 27 and 28. In FIG. 29, three griddle assemblies 10g are not integral and are connected to one another with plates and fasteners. A roller 152g is disposed to support the center griddle assembly 10g.

Figure 31:
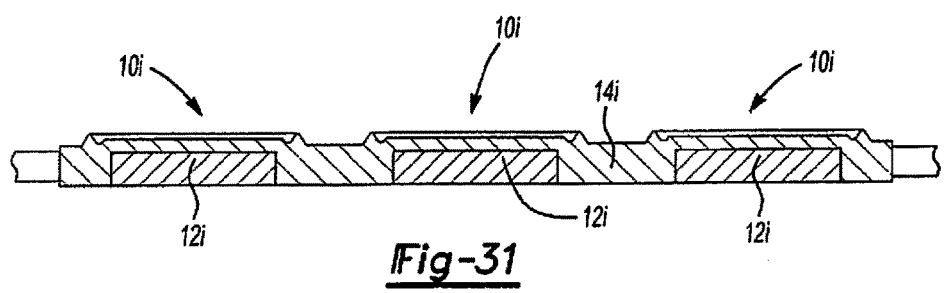
FIG. 31 is a cross-section of an alternative embodiment of the invention and is analogous to the cross-section shown in FIG. 27.

Yet another embodiment is shown in FIG. 31. In FIG. 31, the core 12f of the griddle assembly 10f is not encased by the apron 14f. In an exemplary embodiment, the apron 14f would define a cavity in which the core 12f would be disposed.

It is noted that while the embodiments of the invention disclose griddle assemblies disposed cantilevered from chains, alternative embodiments of the invention can be practiced wherein griddle assemblies are laid on conveyors for movement along a production line. Also, the top and bottom griddle assemblies may be arranged together in clam-shell as seen in FIG. 30. In addition, the production line may define a path other than race-track, such as circular.

The disclosure herein sets forth exemplary embodiments, but particular operating environments in which the invention is practiced may suggest or dictate different ways for supporting and moving the griddle assemblies. Considerations such as efficiency and flexibility, as well as others, may provide the basis for deviating from the specific embodiments disclosed herein.

The subject invention further provides for a method of producing an edible food product. The method may be utilized with the embodiments described above or any variation or modifications to the disclosed embodiment that may become apparent to those skilled in the art. In summary, the method begins by forming a vessel core 12 with a first material having a first level of susceptibility to heating by induction. An apron 14 of a second material with a second level of susceptibility to heating by induction lower than the first level is then cast around at least a first portion the vessel core 12 in an in situ casting process to form a first clad cooking vessel 10 having a first cooking surface 24. The clad cooking vessel 10 may next be placed in a carrier 151h or on a conveyer system, as described above. The method may include the optional step of preheating the cooking clad vessel 10 by subjecting the vessel core 12 to a magnetic field after the casting step. An uncooked food product, such as batter or dough is disposed on the first cooking surface 24 of the first clad cooking vessel 10. The method may include the step of forming a second clad cooking vessel 10 having a second cooking surface 24. This second clad cooking vessel 10 is formed in the same manner as the first clad cooking vessel 10 described above. The second clad cooking vessel 10 is then mated with the first clad cooking vessel 10 after the disposing an uncooked food product step so that the second cooking surface 24 of the second clad cooking vessel is in confronting relation with the first cooking surface 24 of the first clad cooking vessel 10 to substantially surround the uncooked food product. The uncooked food product is then subjected to a magnetic field which heats the uncooked food product in the clad cooking vessel 10. The magnetic field causes the vessel cores 12 to heat up by induction to cook, bake or toast the uncooked food product. In addition to the magnetic field, the uncooked food product may be subject to a secondary heat source as previous discussed. In an exemplary embodiment, a hybrid oven, such as an oven with direct fire via a gas burner or any other oven known in the art may be used in addition to the induction coil. Finally, the cooked food product is removed from the first clad cooking vessel 10 after the heating step and packaged for distribution.

The following invention provides many advantages. For one, the heat used to cook the food product is concentrated in the cooking surface 24 of the griddle assemblies 10. As such, less heat is put off by the machinery utilizing such a system. Additionally, the griddle assemblies 10 are easily interchangeable. For example, a production line may be quickly modified to produce food products of a different form by simply changing out the griddle assemblies 10.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A production system for food products comprising:
   a first endless conveyor defining a first path;
   a plurality of first clad cooking vessels disposed in spaced arrangement along said first endless conveyor for movement along said first path wherein each of said plurality of first clad cooking vessels defines a first cooking surface for receiving a quantity of uncooked food product to be cooked, the first clad cooking vessels including first mounting arms extending outwardly therefrom, the first mounting arms engaged to the first endless conveyor;
   a second endless conveyor defining a second path;
   a plurality of second clad cooking vessels disposed in spaced arrangement along said second endless conveyor for movement along said second path wherein each of said plurality of second clad cooking vessels defines a second cooking surface for operably engaging the quantity of uncooked food product to be cooked, the second clad cooking vessels including second mounting arms extending outwardly therefrom, the second mounting arms engaged to the second endless conveyor;
   at least one heating system disposed proximate to both of said first and second endless conveyors to heat said plurality of first and second clad cooking vessels;
   wherein each of said first and second paths include a first segment and a second segment, the first segments of said first and second paths overlapping to dispose said first and second cooking surfaces in confronting relation along said overlapping first segments of said first and second paths; and
   at least one elongate alignment bar extending along one of the first path of the first endless conveyor or the second path of the second endless conveyor, the at least one elongate alignment bar configured to cooperate with one of the first or second mounting arms to position one of the first or second clad cooking vessels in alignment with the other of the first or second clad cooking vessels.

2. The production system as set forth in claim 1 wherein said first and second conveyors are vertically stacked.

3. The production system as set forth in claim 2 wherein said at least one heating system further comprises:
   a first induction coil assembly surrounded by said first path to heat said plurality of first clad cooking vessels; and
   a second induction coil assembly surrounded by said second path to heat said plurality of second clad cooking vessels.

4. The production system as set forth in claim 1 wherein said at least one heating system further comprises:
   a first induction coil assembly;
     a second induction coil assembly spaced vertically from said first induction coil to define a gap therebetween, wherein said first segments of said first and second paths overlapping so that said first and second clad cooking vessels are in confronting relation and heated within said gap.

5. The production system as set forth in claim 4 wherein said second endless conveyor includes a cam having a first portion, a vertically spaced second portion, and a crest to blend said first and second portions, said cam directing said second clad cooking vessel upward so that said first and second clad cooking vessels are in confronting relation with each other.

6. A production system for food products comprising:
   a conveyor;

at least one carrier disposed on said conveyor, said carrier having a lower portion and an upper portion linked to said lower portion to move between an open position and a closed position;

at least one first clad cooking vessel disposed in said lower portion of said carrier and defining a first cooking surface for receiving a quantity of uncooked food product to be cooked;

at least one second clad cooking vessel disposed in said upper portion of said carrier and defining a second cooking surface for operably engaging the quantity of uncooked food product to be cooked while in the closed position;

at least one induction coil assembly disposed proximate said conveyor to heat said first and second cooking vessels in said carrier;

wherein first and second clad cooking vessels further comprise at least one vessel core formed of a first material having a first level of susceptibility to heating by induction; an apron of a second material with a second level of susceptibility to heating by induction lower than said first level, the second material cast around at least a first portion of said vessel core; and a plurality of first clad cooking vessels and a plurality of second clad cooking vessels operably engaging the quantity of uncooked food product disposed in said plurality of first clad cooking vessels.

7. The production system as set forth in claim 6 wherein said upper portion of said carrier is hinged to said lower portion to be movable from about 0°-180° relative to said lower portion.

8. The production system as set forth in claim 6 wherein said carrier is a composite material.

* * * * *